US012253679B2

(12) United States Patent
Tremblay et al.

(10) Patent No.: US 12,253,679 B2
(45) Date of Patent: Mar. 18, 2025

(54) OPTICAL SYSTEM FOR AN AUGMENTED REALITY DISPLAY

(71) Applicant: ams International AG, Jona (CH)

(72) Inventors: Eric Tremblay, Eindhoven (NL);
Carlos Macias, Eindhoven (NL);
Volker Zagolla, Eindhoven (NL);
Robin Kaech, Eindhoven (NL)

(73) Assignee: ams International AG, Jona (CH)

( * ) Notice: Subject to any disclaimer, the term of this patent is extended or adjusted under 35 U.S.C. 154(b) by 8 days.

(21) Appl. No.: 18/455,481

(22) Filed: Aug. 24, 2023

(65) Prior Publication Data

US 2023/0400695 A1 Dec. 14, 2023

Related U.S. Application Data

(63) Continuation-in-part of application No. PCT/EP2023/054758, filed on Feb. 24, 2023.

(30) Foreign Application Priority Data

Feb. 25, 2022 (GB) .................................... 2202622

(51) Int. Cl.
*G02B 27/01* (2006.01)
*G02B 5/26* (2006.01)
(Continued)

(52) U.S. Cl.
CPC .......... *G02B 27/0172* (2013.01); *G02B 5/26* (2013.01); *G02B 5/3083* (2013.01); *G02B 5/32* (2013.01);
(Continued)

(58) Field of Classification Search
CPC ............ G02B 27/0172; G02B 27/0176; G02B 27/288; G02B 2027/013; G02B 2027/0159; G02B 5/26; G02B 5/3083; G02B 5/32
See application file for complete search history.

(56) References Cited

U.S. PATENT DOCUMENTS 6,222,677 B1 * 4/2001 Budd .................. G02B 27/0172
359/638
11,112,601 B2 * 9/2021 Sharp .................. G02B 27/0037
(Continued)

FOREIGN PATENT DOCUMENTS

CN 1143210 A 2/1997
CN 111965820 A 11/2020
(Continued)

OTHER PUBLICATIONS

PCT/EP2023/054758, "Intl. Search Report and Written Opinion," mailing date Jul. 24, 2023, 20 pages.
(Continued)

*Primary Examiner* — Amare Mengistu
*Assistant Examiner* — Jennifer L Zubajlo
(74) *Attorney, Agent, or Firm* — Viering, Jentschura & Partner mbB

(57) ABSTRACT

An optical system for an augmented reality (AR) display comprises an image generator for generating image light, and an optical combiner for location in a field of view of a user of the optical system between the user and a scene. The optical combiner is configured to transmit ambient light from the scene towards an eye of the user, the ambient light being incident on a first side of the optical combiner. The image generator and the optical combiner are arranged so that the image light is incident on a second side of the optical combiner, the second side of the combiner being opposite to the first side of the optical combiner. The optical combiner
(Continued)

is configured to reflect the image light so that the image light traverses the optical combiner four times and exits the optical combiner from the second side of the optical combiner, and the optical combiner is configured to transmit the ambient light so that the ambient light traverses the optical combiner only once and exits the optical combiner from the second side of the optical combiner.

29 Claims, 13 Drawing Sheets

(51) Int. Cl.
  *G02B 5/30* (2006.01)
  *G02B 5/32* (2006.01)
  *G02B 27/28* (2006.01)
(52) U.S. Cl.
  CPC ....... *G02B 27/0176* (2013.01); *G02B 27/288* (2013.01); *G02B 2027/013* (2013.01); *G02B 2027/0159* (2013.01)

(56) References Cited

U.S. PATENT DOCUMENTS

| 2014/0240843 | A1* | 8/2014 | Kollin | G02B 5/30 |
| | | | | 359/633 |
| 2017/0255013 | A1* | 9/2017 | Tam | G03H 1/2294 |
| 2017/0293143 | A1* | 10/2017 | Martinez | G02B 27/0172 |
| 2019/0278086 | A1* | 9/2019 | Ofir | G02B 6/122 |

FOREIGN PATENT DOCUMENTS

| WO | 2014/133921 A1 | 9/2014 |
| WO | 2017/199232 A1 | 11/2017 |

OTHER PUBLICATIONS

GB2202622.3, "GB Search Report," mailing date Aug. 18, 2022, 3 pages.

* cited by examiner

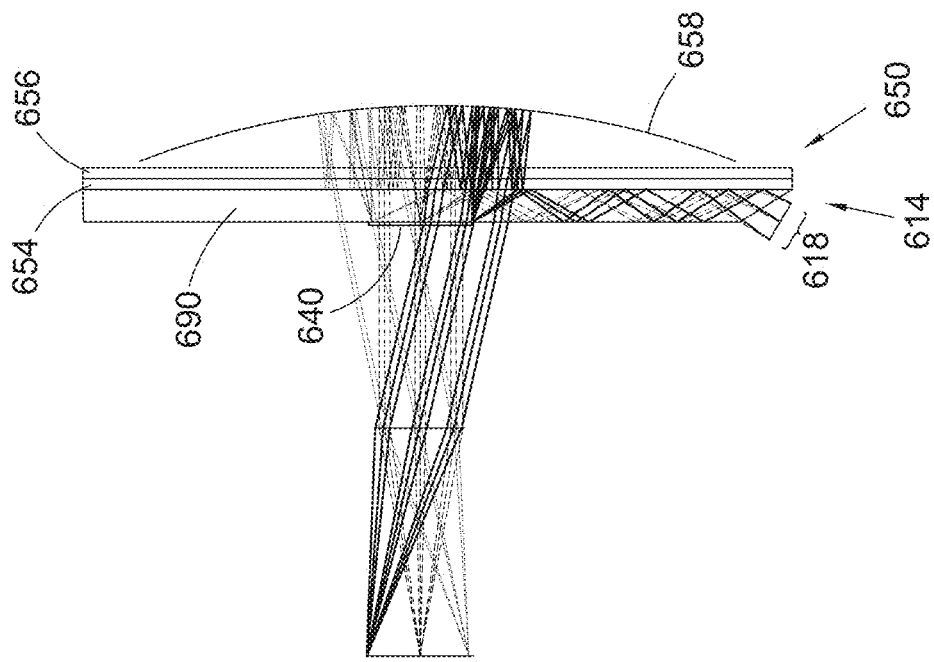
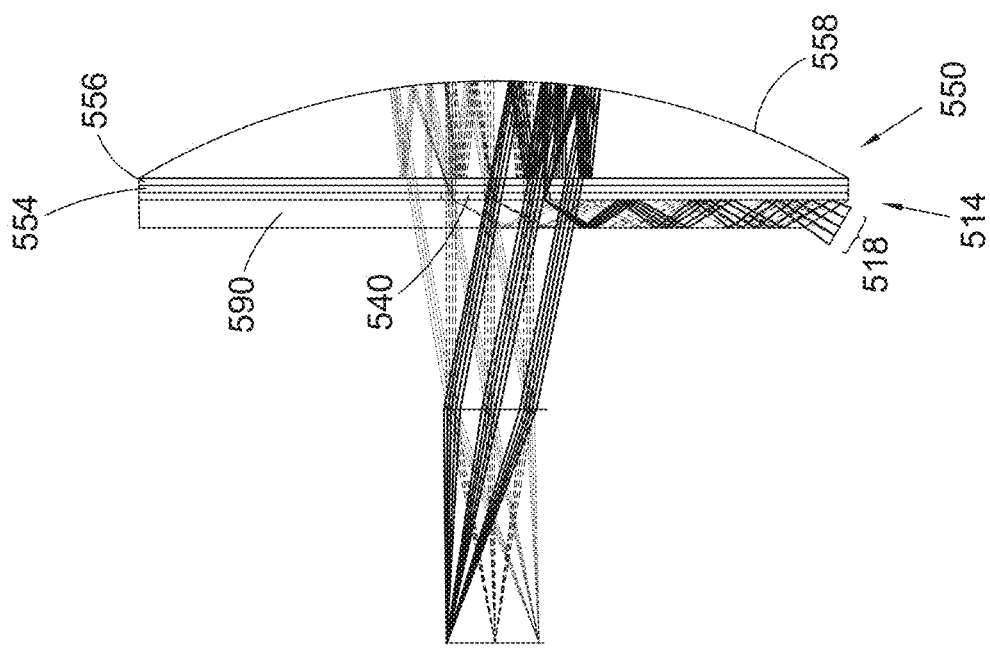

OPTICAL SYSTEM FOR AN AUGMENTED REALITY DISPLAY

CROSS-REFERENCES TO OTHER APPLICATIONS

This application is a continuation-in-part of PCT/EP2023/054758, filed on Feb. 24, 2023, for "OPTICAL SYSTEM FOR AN AUGMENTED REALITY DISPLAY", which claims priority to United Kingdom patent application Ser. No. 2202622.3, filed on Feb. 25, 2022, both of which are hereby incorporated by reference in their entirety for all purposes.

FIELD

The present disclosure relates to an optical system for an augmented reality (AR) display and, in particular though not exclusively, for a wearable AR display such as a head-mounted AR display.

BACKGROUND

Off-axis retinal scanning displays (ORSDs) are a type of display that are used in virtual and augmented reality applications such as in wearable heads-up displays. ORSDs are designed to allow a user to see projected content in their field of view whilst viewing an external environment. ORSDs work by using a projector secured to a user's head to project an image onto the retina of the user which causes the user to see displayed content floating in space in front of them.

The projector is attached to the side of (i.e. off-axis to) a wearable frame, for example a headset or glasses frame with eye pieces. Each eye piece is provided with a holographic combiner which is illuminated by the projector. The illuminated holographic combiners cause the image to be projected through the user's pupil onto their retina.

As is known in the field, in near-eye optical devices such as ORSDs, the term "eyebox" refers to a volume of space relative to the ORSD in which the user has to position their eye to be able to correctly see the full, projected image. If an ORSD has a small eyebox, the range of eye positions at which the user can correctly see the full image is small. If an ORSD has a large eyebox, the range of eye positions at which the user can correctly see the full image is greater which thus provides a better user experience. If the user moves their eye position outside of the eyebox, they will see only part of the projected image or not see it at all. This is because it is only in the eyebox that the user's pupil and thus retina is correctly aligned with the optical path of the light projected by the ORSD. It is also known that the gaze direction of a user can effect whether or not the user's pupil lines up with the optical path of the light projected by the ORSD, particularly where the eyebox is small and only covers the eye position of a user gazing directly ahead.

A further problem is that users have different head shapes and sizes which means it is necessary to custom fit ORSDs individually to a user's head measurements to get the eyebox to line up with the eye of a given user—something which is inefficient to do at scale for mass production.

One way to overcome such issues is to actively steer the eyebox of the ORSD to overlap with the pupil of the eye of the user. For example by tracking the user's eye position and adapting the projection direction of the projector to match the user's eye position. However such systems are complex, may require motorised or actuated components and are therefore not practical.

An alternative approach is to use pupil replication. As is known in the field, the term "pupil" in pupil replication refers to copying the exit pupil of the projector, that is, a copy of the full image being projected. Pupil replication works by replicating the full image a number of times and projecting each copy to a different position in front of the user's eye. As long as one of the replicated pupils overlaps with the pupil of the user's eye, at least one copy of the image will be projected onto the user's retina and the user will be able to see the projected image correctly. This has the effect of increasing the size of the eyebox as the user's eye can be in any position where there is overlap with at least one replicated pupil.

However, some known pupil replication systems rely on the use of bulky optics such as bulky prisms. Some known pupil replication systems may result in an eyebox which is too small to be practical, may have a limited field of view and/or may require the use of optical components which are complex or which are complex to manufacture.

Moreover, it is known to use a transmissive optical combiner which includes a beam splitter such as 50/50 beamsplitter in an eyepiece of a ORSD for an AR display. However, in such an eyepiece, a proportion of the light from the image projector is lost and does not contribute to the image in the plane of the user's eye. This is not only wasteful in terms of the power of the image projector, but can also lead to problems with ghosting if the light which is lost is not managed properly.

SUMMARY

According to an aspect of the present disclosure there is provided an optical system for an augmented reality (AR) display, the optical system comprising:
   an image generator for generating image light; and
   an optical combiner for location in a field of view of a user of the optical system between the user and a scene,
   wherein the optical combiner is configured to transmit ambient light from the scene towards an eye of the user, the ambient light being incident on a first side of the optical combiner,
   wherein the image generator and the optical combiner are arranged so that the image light is incident on a second side of the optical combiner, the second side of the optical combiner being opposite to the first side of the optical combiner, and
   wherein the optical combiner is configured to reflect the image light so that the image light traverses the optical combiner four times and exits the optical combiner from the second side of the optical combiner, and the optical combiner is configured to transmit the ambient light so that the ambient light traverses the optical combiner only once and exits the optical combiner from the second side of the optical combiner.

The optical combiner may cause the image light to propagate along a folded optical path which is defined within the optical combiner. In such an optical system, the optical combiner may be relatively thin thereby reducing the physical thickness of an eyepiece which includes the optical combiner and resulting in a more compact eyepiece and a more compact optical system for an AR display. In addition, such an optical system may include optical components that are relatively simple to manufacture. Moreover, the optical combiner may be configured to at least partially suppress unwanted internal reflections of image light and may be optically very efficient relative to known transmissive optical combiners for AR displays which include beam splitters such as 50/50 beamsplitters. Moreover, since the optical combiner may be configured to at least partially suppress unwanted internal reflections of image light, use of such an optical combiner may also at least partially suppress the formation of any ghost images at the eyebox.

Optionally, the optical system is configured so that the ambient light exiting the optical combiner from the second side of the optical combiner is collimated, converging or diverging.

Optionally, the optical system is configured so that the image light exiting the optical combiner from the second side of the optical combiner is collimated, converging or diverging.

Optionally, the optical system is configured so that the divergence of the ambient light exiting the optical combiner from the second side of the optical combiner and the divergence of the image light exiting the optical combiner from the second side of the optical combiner are comparable or are the same, for example wherein the optical system is configured so that the ambient light exiting the optical combiner from the second side of the optical combiner and the image light exiting the optical combiner from the second side of the optical combiner are similarly convergent, similarly divergent or similarly collimated.

Optionally, the optical combiner is configured to control the divergence of the image light.

Optionally, the optical combiner comprises:

a polarisation-dependent reflector; and an optically-powered reflector.

Optionally, the optical combiner comprises a retarder.

Optionally, the retarder is positioned between the polarisation-dependent reflector and the optically-powered reflector.

Optionally, the polarisation-dependent reflector and the retarder are located adjacent to one another.

Optionally, the polarisation-dependent reflector and the retarder engage one another.

Optionally, the polarisation-dependent reflector and the retarder are parallel to one another.

Optionally, the polarisation-dependent reflector and the optically-powered reflector define an optical cavity.

Optionally, the retarder is located in the optical cavity.

Optionally, the retarder comprises, or is configured to act as, a quarter-wave plate.

Optionally, the optical combiner is, or comprises, a reflective pancake optical combiner.

Optionally, the polarisation-dependent reflector is located at the second side of the optical combiner; Optionally, the polarisation-dependent reflector is configured to selectively reflect light according to a polarisation of the light.

Optionally, the polarisation-dependent reflector is configured to only reflect light which has a predetermined polarisation.

Optionally, the polarisation-dependent reflector is configured to only reflect light which has a wavelength in one or more narrow spectral bands, each spectral band being arranged around a wavelength of the image light.

Optionally, the polarisation-dependent reflector is configured to only reflect light of a predetermined linear polarisation.

Optionally, the polarisation-dependent reflector comprises a polarizing mirror.

Optionally, the optically-powered reflector is located at the first side of the optical combiner.

Optionally, the optically-powered reflector is configured to reflect, and control the divergence of, the image light.

Optionally, the optically-powered reflector comprises at least one of: a curved mirror, a Fresnel reflector, or a diffractive mirror such as a volume phase hologram or a polarisation volume grating.

Optionally, the optically-powered reflector is configured to reflect light in one or more narrow spectral bands, each spectral band being arranged around a wavelength of the image light.

Optionally, the optically-powered reflector is configured to have a reflectance in each spectral band of 90% or greater, 95% or greater, or 99% or greater.

Optionally, the optically-powered reflector comprises an optically-powered dichroic reflector.

Optionally, the optically-powered reflector comprises a transparent substrate.

Optionally, the optically-powered reflector comprises a dichroic reflective coating disposed on one surface of the transparent substrate.

Optionally, the optically-powered reflector is configured to partially reflect the image light, for example wherein the optically-powered reflector is configured to reflect 50% of the image light;

Optionally, the optically-powered reflector comprises an optically-powered partial reflector.

Optionally, the optically-powered reflector comprises a partially reflective coating, such as a half-silvered partially reflecting coating, disposed on one surface of the transparent substrate.

Optionally, the optical system comprises a circular polariser for circularly polarising ambient light before the ambient light is incident on the first side of the optical combiner.

Optionally, the circular polariser is disposed on an outer surface of the optically-powered reflector.

Optionally, the optical cavity comprises air or is air-filled.

Optionally, a solid transparent member or a solid transparent material is located in the optical cavity.

Optionally, the optical cavity is filled with a solid transparent material such as a polymer material or a glass material.

Optionally, the optical system comprises one or more optically-powered lenses and/or one or more eyewear lenses having no optical power.

Optionally, the optical system comprises an optical spreader for spreading the image light so as to form spread image light.

Such an optical system may be used to replicate an exit pupil of the image generator at a plurality of positions in a plane at the eye of the user or so as to form an expanded version of an exit pupil of the image generator in a plane at the eye of the user to thereby expand an eyebox of the optical system to a size which is large enough to be practical.

Optionally, the optical spreader is located between the image generator and the optical combiner.

Optionally, the optical spreader is located within, or forms part of, the optical combiner.

Optionally, the optical spreader is located between the polarisation-dependent reflector and the optically-powered reflector. For example, the optical spreader may be located between the polarisation-dependent reflector and the retarder, or the optical spreader may be located between the retarder and the optically-powered reflector.

Optionally, the optical spreader is configured to selectively spread light incident on the optical spreader according to an angle of incidence of the light incident on the optical spreader.

Optionally, the optical spreader is configured to be located in the field of view of the user.

Optionally, the optical spreader is configured to transmit the ambient light without spreading the ambient light.

Optionally, the optical spreader is configured to transmit the ambient light without aberration of the ambient light.

Optionally, the optical spreader is configured to transmit and spread the image light so as to form the spread image light.

Optionally, the optical spreader comprises an optical fan-out component.

Optionally, the optical spreader comprises a hologram such as a volume phase hologram (VPH).

Optionally, the optical spreader comprises an optical beam-expander or an optical diffuser.

Optionally, the optical spreader has no optical power.

Optionally, the optical spreader is flat or planar.

Optionally, the optical spreader is optically-powered.

Optionally, the optical spreader is curved.

Optionally, the optical spreader is configured to reflect and spread the image light so as to form the spread image light.

Optionally, the optical spreader and the optical combiner are both curved and concentric or near-concentric.

Optionally, the image generator is configured to focus the image light to a focal plane and the optical spreader is located at the focal plane.

Optionally, the optical system comprises an optical waveguide for guiding the image light from the image generator to the optical spreader.

Optionally, the optical waveguide is configured to allow the ambient light to pass through a thickness of the optical waveguide, for example without aberration of the ambient light.

Optionally, the image generator is, or comprises, an image projector for projecting the image light.

Optionally, the image generator is configured to emit image light which includes one or more wavelengths such as one or more of red light, green light or blue light.

Optionally, the image generator is, or comprises, a scanning laser projector such as an off-axis scanning laser projector.

Optionally, the optical system is, or comprises, an off-axis projection display such as an off-axis retinal scanning display.

Optionally, the image generator is, or comprises, an LED-based projector such as an LED-LCOS projector or a micro-LED projector.

Optionally, the image generator is, or comprises, a digital micromirror array projector or a digital light processing (DLP) projector.

Optionally, the image generator comprises a display.

Optionally, the display is configured for location in the field of view of the user for example wherein the display comprises a transparent display such as a transparent OLED display.

Optionally, the optical system comprises a linear polariser located on an optical path between the display and the optical combiner.

Optionally, the polarisation-dependent reflector is configured to only reflect light of a predetermined circular polarisation.

Optionally, the polarisation-dependent reflector comprises a chiral mirror.

Optionally, the optical system further comprises a polarisation controller located between the image generator and the optical spreader, wherein the polarisation controller is configured to convert the image light to circularly polarised image light.

Optionally, the optical system further comprises a polarisation controller located between the optical spreader and the optical combiner, wherein the polarisation controller is configured to convert the spread image light to circularly polarised spread image light.

Optionally, the polarisation controller comprises a circular polariser.

Optionally, the polarisation controller comprises, or is configured to act as, a quarter-wave plate.

Optionally, the optically-powered reflector comprises a linear polariser on an outer surface thereof for linearly polarising ambient light. Such a linear polariser may be used to linearly polarise ambient light when the polarisation-dependent reflector is configured to only reflect light of a predetermined circular polarisation and when the optical combiner comprises a quarter-wave plate so that the ambient light arrives at the polarisation-dependent reflector with the appropriate predetermined circular polarisation to ensure that the circularly-polarised ambient light is transmitted by the polarisation-dependent reflector.

According to an aspect of the present disclosure there is provided an eyepiece for a head-mounted AR display, the eyepiece comprising the optical combiner and, optionally, the eyepiece also comprising the optical spreader and/or the image generator.

According to an aspect of the present disclosure there is provided a wearable AR display comprising:
the optical system as described above; and
a support frame for mounting the optical system on a user so that the optical combiner is positioned in a field of view of the user.

Optionally, the support frame is configured for mounting the optical system on the user so that the optical spreader is positioned in the field of view of the user.

Optionally, the support frame is configured for mounting the optical system on the user so that the transparent display is positioned in the field of view of the user.

Optionally, the wearable AR display comprises first and second user-side eyepieces, wherein one of the first and second user-side eyepieces comprises the optical combiner and optionally also the optical spreader.

Optionally, the support frame comprises a user-side support frame, wherein the first and second user-side eyepieces are mounted on the user-side support frame.

Optionally, the wearable AR display comprises a world-side support frame and first and second world-side eyepieces mounted on the world-side support frame.

Optionally, the world-side support frame is reconfigurable between a first configuration in which the world-side support frame is held in place in front of the user-side support frame so as to hold each of the first and second world-side eyepieces in a corresponding line of sight between a scene and a user's corresponding eye in front of the corresponding user-side eyepiece, and a second configuration in which each of the first and second world-side eyepieces is positioned out of the corresponding line of sight.

Optionally, the user-side support frame and the world-side support frame are detachably attachable to one another.

Optionally, the world-side support frame is detachably attachable to the user-side support frame.

Optionally, the user-side support frame and/or the world-side support frame include one or more fastener arrangements such as one or more clip arrangements, one or more magnetic arrangements, one or more hook arrangements and/or one or more latch arrangements for detachably attaching the user-side and world-side support frames together.

Optionally, the user-side support frame and/or the world-side support frame comprise one or more hinges.

Optionally, the user-side support frame and the world-side support frame are attached by the one or more hinges to enable the world-side support frame to be rotated into position and held in place in front of the user-side support frame so as to position the first and second world-side eyepieces in front of the first and second user-side eyepieces respectively.

Optionally, the alignment between the world-side support frame and the user-side support frame is adjustable to facilitate alignment of the first and second world-side eyepieces relative to the first and second user-side eyepieces respectively.

Optionally, the wearable AR display comprises first and second world-side support frames and first and second world-side eyepieces mounted on the first and second world-side support frames respectively, wherein each of the first and second world-side support frames is reconfigurable between a first configuration in which the world-side support frame is held in place in front of the user-side support frame so as to hold the corresponding world-side eyepiece in a corresponding line of sight between a scene and a user's corresponding eye in front of the corresponding user-side eyepiece, and a second configuration in which the corresponding world-side eyepiece is positioned out of the corresponding line of sight.

Optionally, the user-side support frame and the first world-side support frame are detachably attachable to one another and/or the user-side support frame and the second world-side support frame are detachably attachable to one another.

Optionally, the first world-side support frame is detachably attachable to the user-side support frame in front of the user-side support frame so as to position and hold the first world-side eyepiece in place in front of the first user-side eyepiece and/or the second world-side support frame is detachably attachable to the user-side support frame in front of the user-side support frame so as to position the second world-side eyepiece in front of the second user-side eyepiece.

Optionally, the user-side support frame and/or one or both of the first and second world-side support frames include one or more fastener arrangements such as one or more clip arrangements, one or more magnetic arrangements, one or more hook arrangements and/or one or more latch arrangements for holding the first world-side eyepiece in the corresponding line of sight between the scene and the user's corresponding eye in front of the first user-side eyepiece and/or for holding the second world-side eyepiece in the corresponding line of sight between the scene and the user's corresponding eye in front of the second user-side eyepiece.

Optionally, the user-side support frame and/or the first world-side support frame comprise one or more hinges.

Optionally, the user-side support frame and the first world-side support frame are attached by one or more hinges to enable the first world-side support frame to be rotated into position and held in place in front of the user-side support frame so as to position the first world-side eyepiece in front of the first user-side eyepiece.

Optionally, the user-side support frame and/or the second world-side support frame comprise one or more hinges.

Optionally, the user-side support frame and the second world-side support frame are attached by one or more hinges to enable the second world-side support frame to be rotated into position and held in place in front of the user-side support frame so as to position the second world-side eyepiece in front of the second user-side eyepiece.

Optionally, the alignment of one or both of the first and second world-side support frames is adjustable relative to the user-side support frame to facilitate the alignment of the first world-side eyepiece relative to the first user-side eyepiece and/or to facilitate the alignment of the second world-side eyepiece relative to the second user-side eyepiece.

Optionally, one or both of the first and second world-side eyepieces comprises an optically-powered lens.

Optionally, one or both of the first and second world-side eyepieces comprises an eyewear lens having no optical power.

Optionally, one or both of the first and second world-side eyepieces comprises an optical filter.

Optionally, one or both of the first and second world-side eyepieces is tinted.

Optionally, one or both of the first and second world-side eyepieces is polarising.

Optionally, one or both of the first and second world-side eyepieces is electrochromic.

According to an aspect of the present disclosure there is provided a head-mounted AR display comprising:
the optical system as described above; and
a support frame for mounting the optical system on a head of a user so that the optical combiner is positioned in a field of view of the user.

Optionally, the support frame is configured for mounting the optical system on the head of the user so that the optical spreader is positioned in the field of view of the user.

Optionally, the support frame is configured for mounting the optical system on the user so that the transparent display is positioned in the field of view of the user.

According to an aspect of the present disclosure there is provided a vehicle, such as a terrestrial vehicle or an aircraft, comprising the optical system as described above.

Optionally, the vehicle comprises a windscreen, wherein the optical combiner is incorporated into the windscreen.

Optionally, the optical spreader is incorporated into the windscreen.

Optionally the transparent display is incorporated into the windscreen.

According to an aspect of the present disclosure there is provided an optical combiner for an augmented reality (AR) display, the optical combiner comprising:
a polarisation-dependent reflector; and
an optically-powered reflector.

Optionally, the optical combiner comprises a retarder.

Optionally, the retarder is located between the polarisation-dependent reflector and the optically-powered reflector.

Optionally, the polarisation-dependent reflector and the optically-powered reflector define an optical cavity.

Optionally, the retarder is located in the optical cavity.

Optionally, the retarder comprises, or is configured to act as, a quarter-wave plate.

Optionally, the optical combiner is, or comprises, a reflective pancake optical combiner.

Optionally, the polarisation-dependent reflector is configured to selectively reflect light according to a polarisation of the light.

Optionally, the polarisation-dependent reflector is configured to only reflect light which has a predetermined polarisation.

Optionally, the polarisation-dependent reflector is configured to only reflect light which has a wavelength in one or more narrow spectral bands.

Optionally, the polarisation-dependent reflector is configured to only reflect light of a predetermined polarisation state.

Optionally, the polarisation-dependent reflector is configured to only reflect light of a predetermined linear polarisation.

Optionally, the polarisation-dependent reflector comprises a polarizing mirror.

Optionally, the optically-powered reflector comprises at least one of: a curved mirror, a Fresnel reflector, or a diffractive mirror such as a volume phase hologram or a polarisation volume grating.

Optionally, the optically-powered reflector is configured to reflect light in one or more narrow spectral bands.

Optionally, the optically-powered reflector is configured to have a reflectance in each spectral band of 90% or greater, 95% or greater or 99% or greater.

Optionally, the optically-powered reflector comprises an optically-powered dichroic reflector.

Optionally, the optically-powered reflector comprises a transparent substrate.

Optionally, the optically-powered reflector comprises a dichroic reflective coating disposed on one surface of the transparent substrate.

Optionally, the optically-powered reflector is configured to partially reflect the image light, for example wherein the optically-powered reflector is configured to reflect 50% of the image light;

Optionally, the optically-powered reflector comprises an optically-powered partial reflector.

Optionally, the optically-powered reflector comprises a partially reflective coating, such as a half-silvered partially reflecting coating, disposed on one surface of the transparent substrate.

Optionally, the optically-powered reflector comprises a circular polariser disposed on an outer surface thereof.

Optionally, the polarisation-dependent reflector is configured to only reflect light of a predetermined circular polarisation.

Optionally, the polarisation-dependent reflector comprises a chiral mirror.

Optionally, the optically-powered reflector comprises a linear polariser disposed on an outer surface thereof.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

An optical system for an AR display will now be described by way of non-limiting example only with reference to the drawings of which:

FIG. 8A is a schematic illustration of an alternative eyepiece for the head-mounted AR display of FIG. 1, the alternative eyepiece including an optical waveguide in use guiding projected image light from an image projector located at an edge or periphery of the eyepiece to a transmissive image spreader located at, or near, a centre of the eyepiece;

FIG. 8B is a schematic illustration of an alternative eyepiece for the head-mounted AR display of FIG. 1, the alternative eyepiece including an optical waveguide in use guiding projected image light from an image projector located at an edge or periphery of the eyepiece to a reflective image spreader located at, or near, a centre of the eyepiece;

DETAILED DESCRIPTION OF THE DRAWINGS

Figure 1:
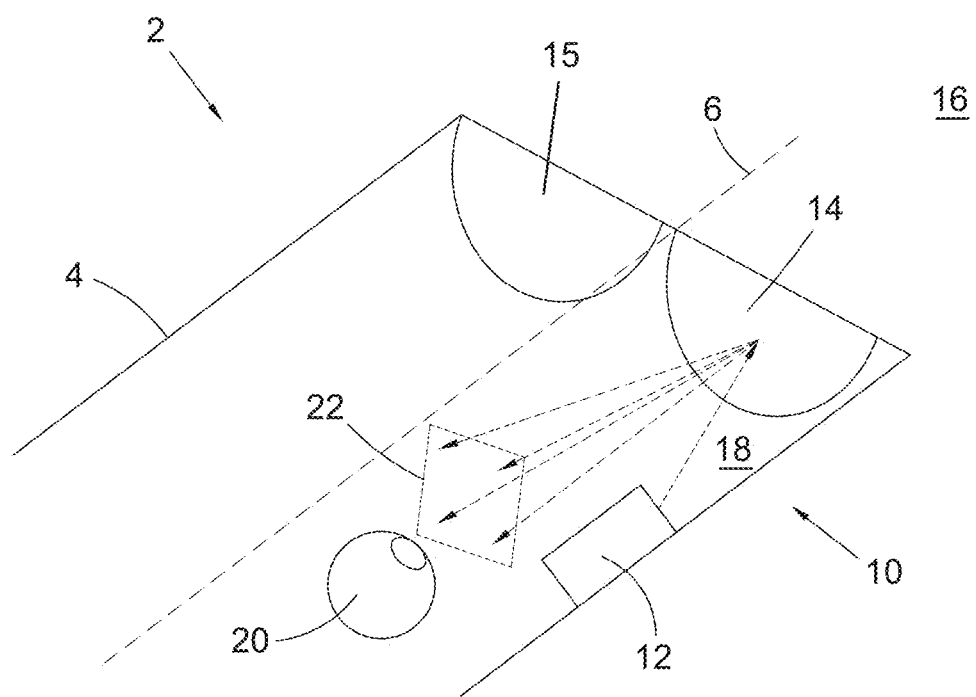
FIG. 1 is a schematic illustration of a head-mounted AR display.

Referring initially to FIG. 1 there is shown a wearable AR display 2 comprising a support frame 4 with a central axis 6 and an optical system 10 in the form of an off-axis retinal scanning display mounted on the support frame 4. The optical system 10 comprises an image generator in the form of a scanning laser projector 12 and an eyepiece 14 mounted on the support frame 4. The projector 12 is offset from the central axis 6. The wearable AR display 2 also includes a further eyepiece 15 mounted on the support frame 4.

In use, when the support frame 4 is mounted on the head of a user with the eyepiece 14 positioned in a field of view of the user, the eyepiece 14 transmits ambient light from a scene 16 located in front of the eyepiece 14 through the eyepiece 14 to an eye 20 of a user located behind the eyepiece 14 and the projector 12 projects linearly-polarised image light 18 defining an image towards the eye 20 of the user by way of the eyepiece 14. The linearly-polarised image light 18 may include one or more wavelengths such as one or more of red light, green light or blue light.

As will be explained in more detail below, the eyepiece 14 replicates the image defined by the projected image light 18 a number of times at a plurality of positions in a plane 22 at the eye 20 of the user to expand an eyebox of the wearable AR display 2.

Figure 2A:
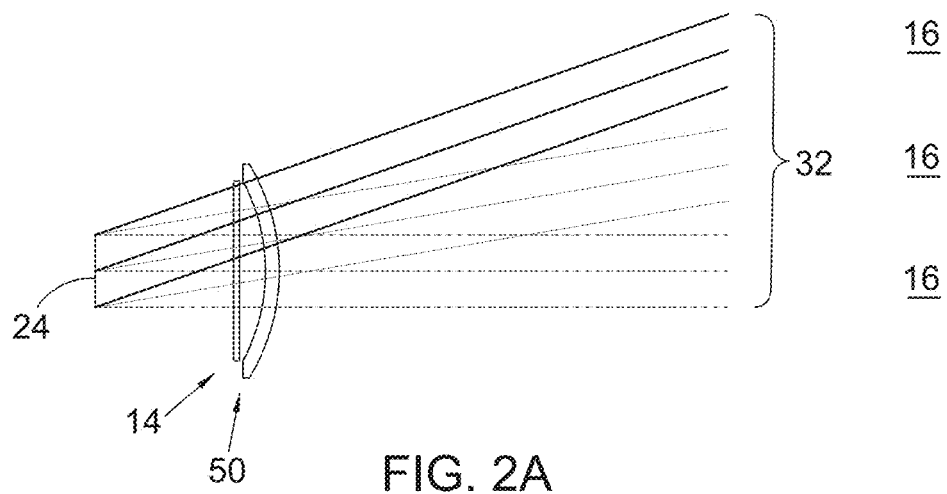
FIG. 2A is a schematic illustration of an eyepiece of the head-mounted AR display of FIG. 1 in use transmitting ambient light from a scene.

FIG. 2A illustrates the eyepiece 14 in use transmitting ambient light 32 from the scene 16 located in front of the eyepiece 14 through the eyepiece 14 towards the expanded eyebox 24 without aberration of the ambient light 32.

Figure 2B:
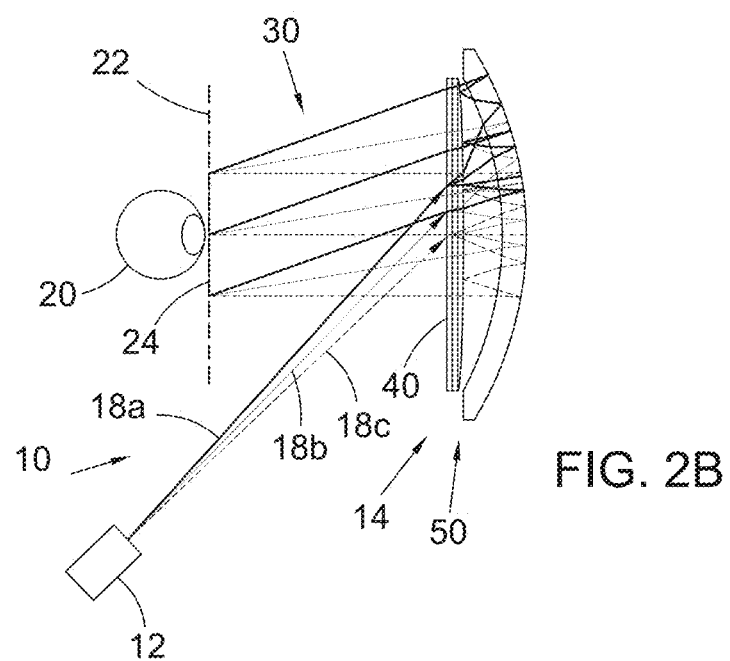
FIG. 2B is a schematic illustration of an optical system of the head-mounted AR display of FIG. 1 in use projecting image light towards an eyepiece of the optical system and collimating and reflecting the projected image light towards the eye of a user so as to form an expanded eyebox.

FIG. 2B illustrates the optical system 10 in use replicating an image defined by first, second and third linearly-polarised principal rays 18a, 18b, and 18c of the projected image light 18 respectively at three different positions in the plane 22 at the eye 20 of the user to provide an expanded eyebox 24 in the plane 22 at the eye 20 of the user. It should be understood that the first, second and third principal rays 18a, 18b, 18c correspond to first, second and third pixels of an image defined by the projector 12.

As shown in FIG. 2A, the eyepiece 14 includes an optical spreader in the form of a transmissive volume phase hologram (VPH) 40 for fanning-out the first, second and third principal rays 18a, 18b, 18c of the projected image light 18 to form spread image light and an optical combiner 50 in the form of a "reflective pancake" optical combiner for reflecting the spread image light back through the VPH 40 to form collimated light 30 which propagates to the plane 22 at the eye 20 of the user to provide the expanded eyebox 24 in the plane 22 at the eye 20 of the user.

Figure 3D:
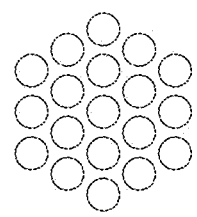
FIG. 3D is a schematic illustration of an exit pupil arrangement of a second alternative optical system comprising a second alternative optical spreader.
Figure 3G:
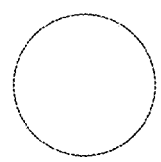
FIG. 3G is a schematic illustration of an exit pupil arrangement of a fifth alternative optical system comprising a fifth alternative optical spreader.
Figure 3C:
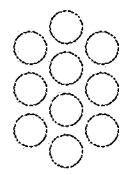
FIG. 3C is a schematic illustration of an exit pupil arrangement of a first alternative optical system comprising a first alternative optical spreader.
Figure 3F:
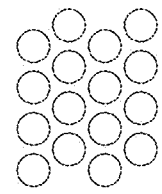
FIG. 3F is a schematic illustration of an exit pupil arrangement of a fourth alternative optical system comprising a fourth alternative optical spreader.
Figure 3B:
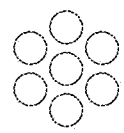
FIG. 3B is a schematic illustration of an exit pupil arrangement of the optical system of FIG. 2B.
Figure 3E:
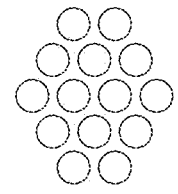
FIG. 3E is a schematic illustration of an exit pupil arrangement of a third alternative optical system comprising a third alternative optical spreader.
Figure 3A:
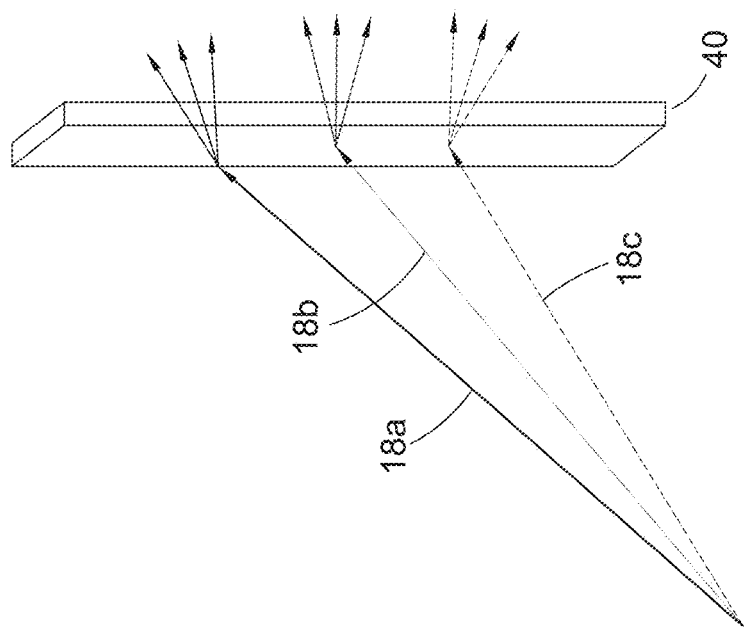
FIG. 3A is a schematic illustration of an optical spreader of the optical system of FIG. 2B.

The VPH 40 is shown in more detail in FIG. 3A. As will be understood by one of skill in the art, the VPH 40 is configured to selectively spread or fan-out light incident on the VPH according to an angle of incidence of the light incident on the VPH 40. Specifically, the VPH 40 is configured to spread or fan-out the image light 18 incident on the VPH 40 at higher angles of incidence but to transmit the ambient light 32 from the scene 16 without spreading or fanning-out the ambient light 32 from the scene 16.

Figure 4:
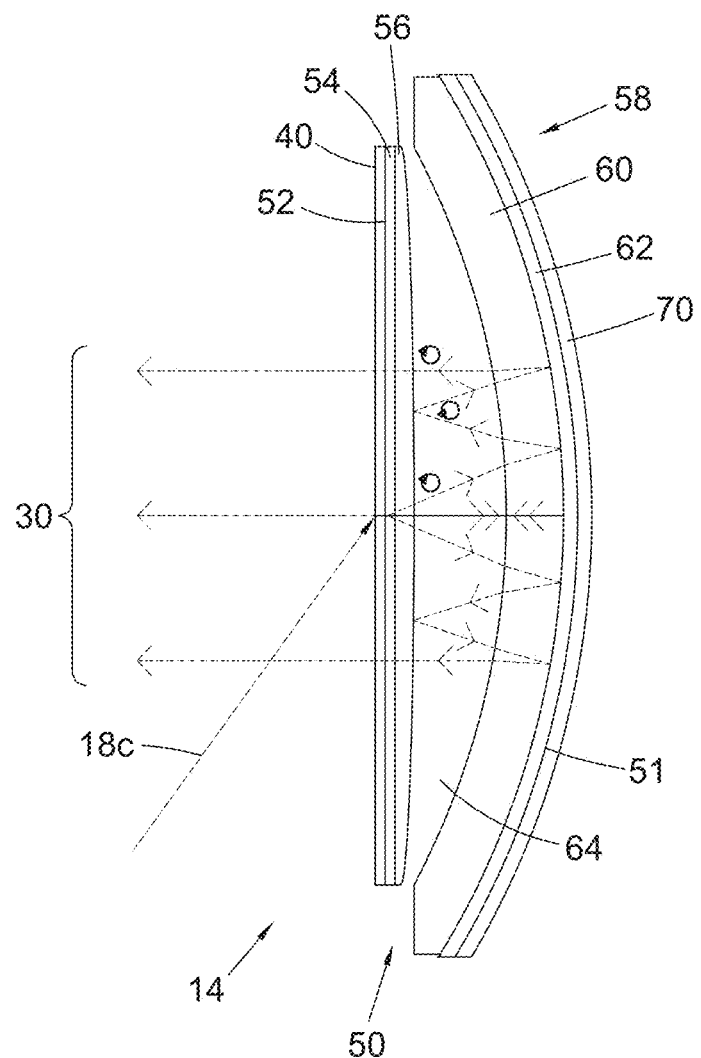
FIG. 4 is a schematic illustration of the eyepiece of the head-mounted AR display of FIG. 1 in use collimating and reflecting a single principal ray of projected image light towards the eye of a user.

As shown in more detail in FIG. 4, the optical combiner 50 has a first or front side 51 disposed towards the scene 16 and a second or rear side 52 disposed towards the VPH 40. The optical combiner 50 includes a polarisation-dependent reflector 54, a retarder 56 which comprises, or which is configured to act as, a quarter-wave plate, and an optically-powered reflector 58. The optically-powered reflector 58 comprises a curved transparent body or substrate 60 having a dichroic reflective coating 62 disposed on a front convex surface thereof. The dichroic reflective coating 62 is configured to be highly reflecting in one or more narrow spectral bands, each narrow spectral band being arranged around a corresponding wavelength of the image light 18, but to transmit light at other wavelengths. For example, the dichroic reflective coating 62 may be configured to have a reflectance in each spectral band of 90% or greater, 95% or greater, or 99% or greater. One of skill in the art will understand that this also means that the dichroic reflective coating 62 is configured to reflect ambient light 32 at wavelengths inside the one or more narrow spectral bands but to transmit ambient light 32 at wavelengths outside the one or more narrow spectral bands.

The retarder 56 is located between the polarisation-dependent reflector 54 and the optically-powered reflector 58. More specifically, the polarisation-dependent reflector 54 and the dichroic reflective coating 62 of the optically-powered reflector 58 define an optical cavity, wherein the retarder 56 is located in the optical cavity. Moreover, the polarisation-dependent reflector 54 and the optically-powered reflector 58 are arranged so that the polarisation-dependent reflector 54 is located in an optical path between the VPH 40 and the optically-powered reflector 58. The retarder 56 and the optically-powered reflector 58 are separated by an air gap 64.

The eyepiece 14 further includes a circular polariser 70 disposed on the dichroic reflective coating 62 of the optically-powered reflector 58.

In use, the optical combiner 50 effectively combines the ambient light 32 which is incident on the front side 51 of the optical combiner 50 with the spread image light which is incident on the rear side 52 of the optical combiner 50 and reflected within the optical combiner 50 so that the spread image light and the ambient light 32 both exit the rear side 52 of the optical combiner 50.

Specifically, the circular polariser 70 imparts a circular polarisation to the ambient light 32 and the circularly-polarised ambient light 32 is incident on the front side 51 of the optical combiner 50 defined by the dichroic reflective coating 62 of the optically-powered reflector 58. The dichroic reflective coating 62 transmits, towards the retarder 56, the wavelengths of the circularly-polarised ambient light 32 which fall outside the one or more narrow spectral bands over which the dichroic reflective coating 62 is highly reflecting. The retarder 56 converts the circularly-polarised ambient light 32 transmitted by the dichroic reflective coating 62 to linearly-polarised ambient light 32 having a linear polarisation which is aligned with a polarisation transmission axis of the polarisation-dependent reflector 54 so that the polarisation-dependent reflector 54 transmits the linearly-polarised ambient light 32 towards the expanded eyebox 24. Use of the circular polariser 70 at least partially suppresses the reflection of ambient light 32 from the polarisation-dependent reflector 54 thereby at least partially suppressing the formation of any ghost images of the scene 16 at the eyebox 24.

FIG. 4 illustrates the path of the third linearly-polarised principal ray 18c of the linearly-polarised image light 18 through the VPH 40 and the optical combiner 50. For the purposes of the following description, it is assumed that the linearly-polarised image light 18, and therefore that the third linearly-polarised principal ray 18c of the linearly-polarised image light 18, has a first linear polarisation which is aligned with a polarisation transmission axis of the polarisation-dependent reflector 54. The VPH 40 spreads, for example fans-out or separates, the third linearly-polarised principal ray 18c of image light 18 into three different directions to form three different linearly-polarised rays of spread image light which are incident on a second or rear side 52 of the optical combiner 50 defined by the polarisation-dependent reflector 54. The first linear polarisation of each of the linearly-polarised rays of spread image light is aligned with the polarisation transmission axis of the polarisation-dependent reflector 54 so that the polarisation-dependent reflector 54 transmits each of the linearly-polarised rays of spread image light towards the retarder 56. The retarder 56 converts the polarisation of each ray of spread image light from the first linear polarisation to a first circular polarisation. Each ray of spread image light then propagates from the retarder 56 to the substrate 60 of the optically-powered reflector 58, is transmitted through the substrate 60, and then reflected at the dichroic reflective coating 62 of the optically-powered reflector 58 to form a corresponding ray of first reflected light having a second circular polarisation which is opposite to the first circular polarisation.

Each ray of first reflected light propagates back through the substrate 60 of the optically-powered reflector 58 towards the retarder 56. The retarder 56 converts the polarisation of each ray of first reflected light from the second circular polarisation to a second linear polarisation which is orthogonal to the first linear polarisation and to the polarisation transmission axis of the polarisation-dependent reflector 54. Accordingly, the polarisation-dependent reflector 54 reflects each ray of first reflected light back towards the retarder 56 as a corresponding ray of second reflected light.

The retarder 56 then converts the polarisation of each ray of second reflected light from the second linear polarisation to the second circular polarisation. Each ray of second reflected light then propagates from the retarder 56 to the substrate 60 of the optically-powered reflector 58, is transmitted through the substrate 60 and then reflected at the dichroic reflective coating 62 of the optically-powered reflector 58 to form a corresponding ray of third reflected light having the first circular polarisation.

Each ray of third reflected light propagates back through the substrate 60 of the optically-powered reflector 58 towards the retarder 56. The retarder 56 converts the polarisation of each ray of third reflected light from the first circular polarisation to the first linear polarisation which is parallel to the polarisation transmission axis of the polarisation-dependent reflector 54. Accordingly, the polarisation-dependent reflector 54 transmits each ray of third reflected light. Each ray of third reflected light corresponding to the third principal ray 18c is transmitted through the VPH 40 without aberration so that the three different rays of third reflected light exit the VPH 40 parallel to one another and form collimated light 30 which replicates the image of the third pixel to which the third principal ray 18c corresponds in the plane 22 at the eye of the user thereby defining the expanded eyebox 24 for the third principal ray 18c.

Similarly, with reference again to FIG. 2B, each ray of third reflected light corresponding to the first principal ray 18a is transmitted through the VPH 40 without aberration so that the three different rays of third reflected light corresponding to the first principal ray 18a are parallel to one another and form collimated light 30 which replicates the image of the first pixel to which the first principal ray 18a corresponds in the plane 22 at the eye of the user thereby defining the expanded eyebox 24 for the first principal ray 18a. Furthermore, each ray of third reflected light corresponding to the second principal ray 18b is transmitted through the VPH 40 without aberration so that the three different rays of third reflected light corresponding to the second principal ray 18b are parallel to one another and form collimated light 30 which replicates the image of the second pixel to which the second principal ray 18b corresponds in the plane 22 at the eye of the user thereby defining the expanded eyebox 24 for the second principal ray 18b. As may be appreciated from FIG. 2B, the collimated light corresponding to the first principal ray 18a and the first pixel travels along a first direction, the collimated light corresponding to the second principal ray 18b and the second pixel travels along a second direction, and the collimated light corresponding to the third principal ray 18c and the third pixel travels along a third direction so that the user's eye may form images of the first, second and third pixels at corresponding different positions on the user's retina.

From the foregoing description of the operation of the eyepiece 14 and FIG. 2B, one of skill in the art will understand that the projected image light 18 is spread by the VPH 40 and then traverses the reflective pancake optical combiner 50 four times before exiting the reflective pancake optical combiner 50 on the same side of the reflective pancake optical combiner 50 as the spread image light entered the reflective pancake optical combiner 50 from the VPH 40. As a consequence of the optical power of the optically-powered reflector 58, the reflective pancake optical combiner 50 collimates the spread image light so as to form collimated light which is transmitted back through the VPH 40 without the VPH 40 further spreading the collimating light so as to form the collimated light 30 which propagates to the plane 22 at the eye of the user and replicates the image in the plane 22 at the eye of the user to thereby expand the eyebox 24. In effect, the reflective pancake optical combiner collimates the spread image light as the spread image light propagates along a folded optical path which is defined within the reflective pancake optical combiner 50 and which extends from the VPH 40 and back to the VPH 40. As such, use of the reflective pancake optical combiner 50 serves to reduce the physical thickness of the eyepiece 14 resulting in a more compact eyepiece 14 and a more compact optical system 10.

Moreover, from the foregoing description, one of skill in the art will understand that the optical system 10 at least partially suppresses unwanted internal reflections and is optically very efficient relative to a known optical system for an AR display that incorporates a transmissive optical combiner which includes a beam splitter such as 50/50 beamsplitter. Moreover, since the reflective pancake optical combiner 50 at least partially suppresses unwanted internal reflections, use of such a reflective pancake optical combiner 50 also at least partially suppresses the formation of any ghost images at the eyebox 24.

In addition, the optical system 10 is capable of expanding the eyebox to a size which is large enough to be practical, the optical system 10 can provide a practical field of view, and the optical system 10 includes optical components that are relatively simple to manufacture.

Figure 2C:
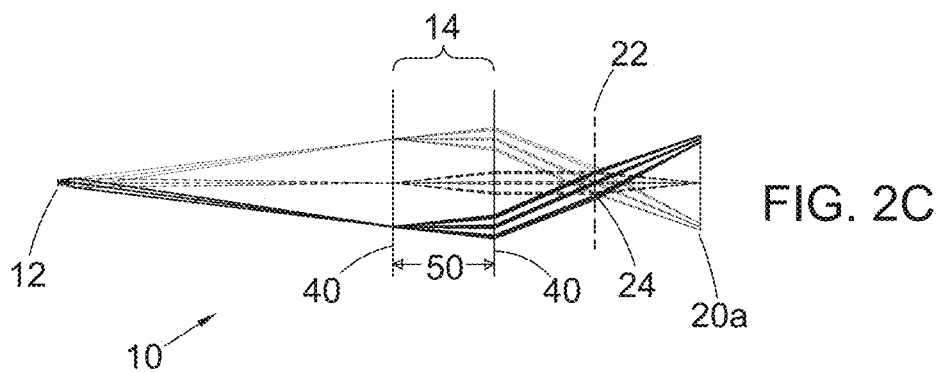
FIG. 2C is a schematic unfolded representation of the optical system of FIG. 2B.

It should be understood that, in the interests of clarity, FIG. 2B only shows the first, second and third principal rays 18*a*, 18*b* and 18*c* of the projected image light 18 emitted along three different directions, and that, in reality, the scanning laser projector 12 emits a beam of image light 18 along each different direction as shown in the unfolded schematic representation of the optical system 10 of FIG. 2C, wherein the beams of image light 18 define the projected image. As shown in FIG. 2C, it should be understood that each beam of image light 18 is focused to a focal plane which coincides with the surface of the VPH 40 upon which the image light 18 is incident. Moreover, as a consequence of the action of the eyepiece 14, each beam of image light 18 defines a plurality of exit pupils in the plane 22 at the eye of the user to provide the expanded eyebox 24 in the plane 22 at the eye of the user, wherein each exit pupil corresponds to one of the replicated images. As shown in FIG. 2C, the replicated images in the expanded eyebox 24 are focussed by the user's eye onto a retina 20*a* of the user's eye.

FIG. 3B shows the exit pupil arrangement generated in the plane 22 at the eye of the user corresponding to the optical system 10 described above with reference to FIGS. 2A, 2B, 2C, 3A, and 4. It should be understood that each circle in FIG. 3B represents an exit pupil.

FIGS. 3C-3F show some alternative exit pupil arrangements generated in the plane 22 at the eye of the user by alternative eyepieces, each alternative eyepiece comprising an alternative transmissive fan-out VPH in combination with the same reflective pancake optical combiner 50.

FIG. 3G shows an alternative exit pupil arrangement generated in the plane 22 at the eye of the user by a further alternative eyepiece comprising an alternative transmissive diffuser or beam-expander VPH when used in combination with the same reflective pancake optical combiner 50. It should be understood that, although the alternative exit pupil arrangement of FIG. 3G only has a single exit pupil, the size of the exit pupil of FIG. 3G is expanded relative to the size of each of the exit pupils of FIGS. 3B-3F i.e. the eyebox corresponding to the exit pupil of FIG. 3G is expanded relative to the size of that the eyebox would have had in the absence of any fan-out VPH or in the absence of any diffuser or beam-expander VPH.

Figure 5A:
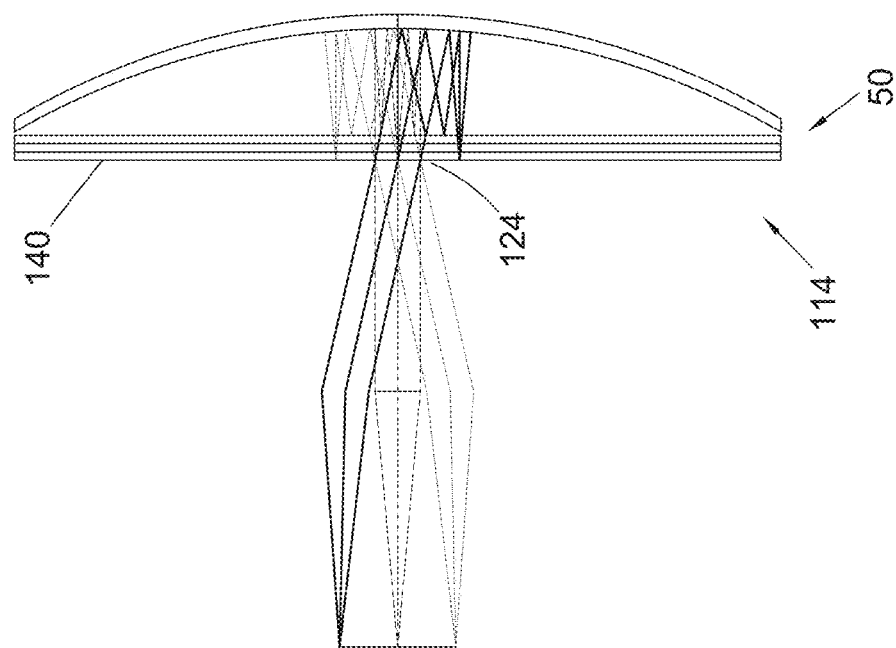
FIG. 5A is a schematic illustration of the eyepiece of the head-mounted AR display of FIG. 1 in use collimating and reflecting three principal rays of projected image light towards the eye of a user.
Figure 5B:
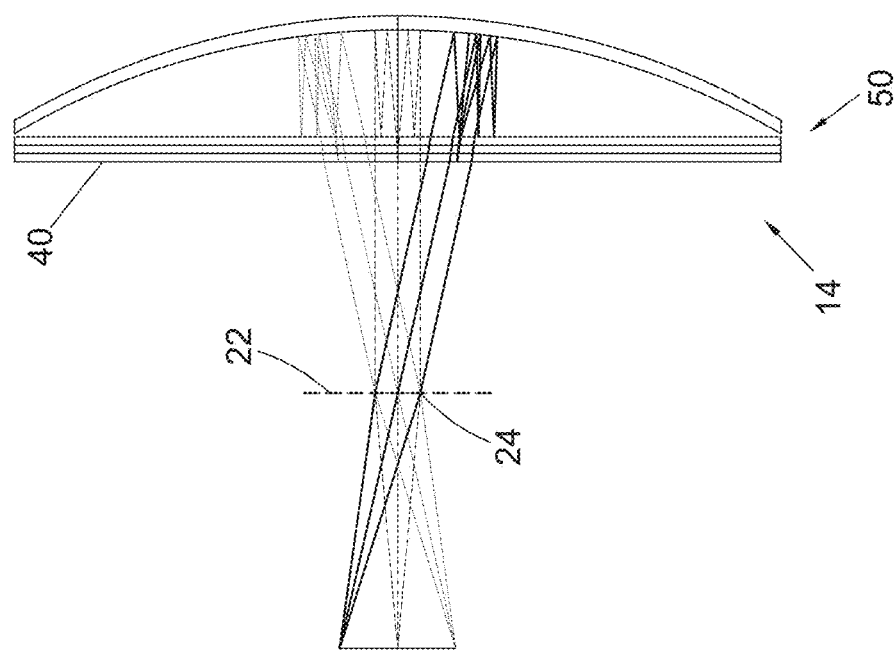
FIG. 5B is a schematic illustration of an alternative eyepiece for the head-mounted AR display of FIG. 1 in use collimating and reflecting three principal rays of projected image light towards the eye of a user.

It should be understood that the plane 22 in which the one or more exit pupils and the expanded eyebox are located may be controlled by varying the configuration of the VPH. For example, as already described above with reference to FIGS. 2A, 2B, 2C, 3A, and 4 and, as shown again in FIG. 5A, the VPH may be a fan-out VPH 40 which is configured so that a plurality of exit pupils form an expanded eyebox 24 located in the plane 22 which is separated from the VPH 40. FIG. 5B shows an alternative eyepiece 114 for use in the optical system 10 in place of the eyepiece 14. The alternative eyepiece 114 comprises an alternative fan-out VPH 140 in combination with the same reflective pancake optical combiner 50 described above with reference to FIGS. 2A, 2B, 2C, 3A, and 4. The alternative fan-out VPH 140 is configured so that a plurality of exit pupils are located on a rear surface of the alternative fan-out VPH 140 so as to form an expanded eyebox 124 on the rear surface of the alternative fan-out VPH 140. One of skill in the art will understand that by varying the configuration of the VPH, the plane 22 in which the one or more exit pupils and the expanded eyebox are located may be positioned between the position shown in FIG. 5A and the rear surface of the VPH 140 as shown in FIG. 5B.

Figure 6B:
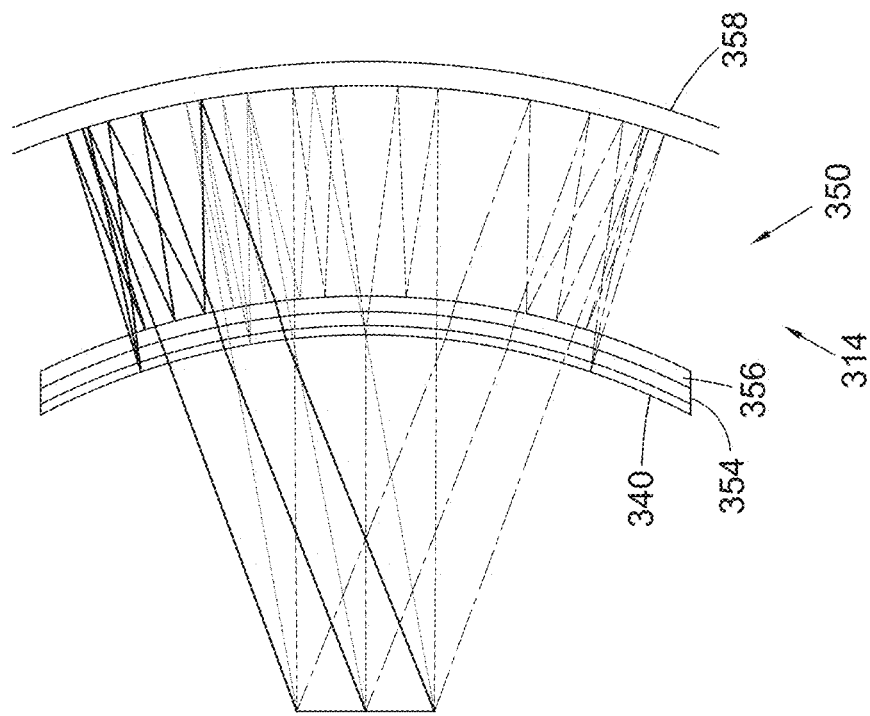
FIG. 6B is a schematic illustration of a quasi-monocentric eyepiece for the head-mounted AR display of FIG. 1 in use collimating and reflecting three principal rays of projected image light towards the eye of a user.
Figure 6A:
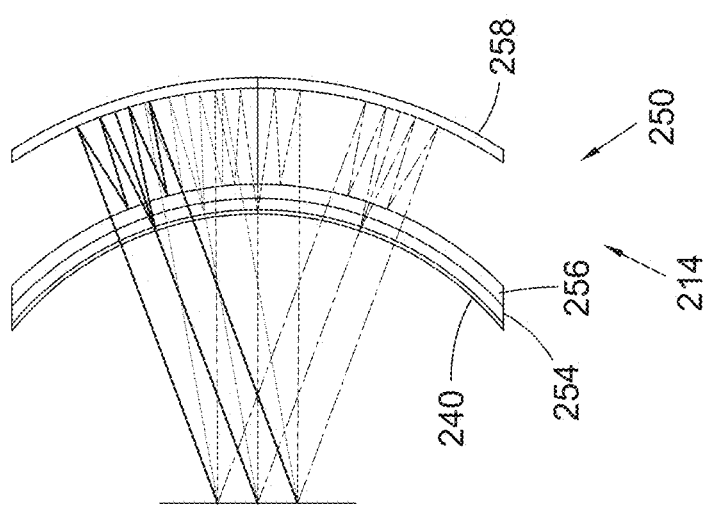
FIG. 6A is a schematic illustration of a monocentric eyepiece for the head-mounted AR display of FIG. 1 in use collimating and reflecting three principal rays of projected image light towards the eye of a user.

FIG. 6A shows an alternative eyepiece 214 for use in the optical system 10 in place of the eyepiece 14. The alternative eyepiece 214 has a curved VPH 240, and a curved reflective pancake optical combiner 250 including a curved polarisation-dependent reflector 254, a curved retarder 256, and a curved optically-powered reflector 258. The curved VPH 240 and the curved reflective pancake optical combiner 250 are monocentric. One of skill in the art will understand that such a monocentric eyepiece 214 may have an improved optical performance relative to the eyepiece 14 described above with reference to FIGS. 2A, 2B, 2C, 3A, and 4. For example, the monocentric eyepiece 214 may have a larger field of view, a higher resolution and/or a larger eyebox. However, the concentric eyepiece 214 may be less practical and more difficult to manufacture than the eyepiece 14.

FIG. 6B shows a quasi-monocentric eyepiece 314 for use in the optical system 10 in place of the eyepiece 14. The quasi-monocentric eyepiece 314 has a curved VPH 340, and a curved reflective pancake optical combiner 350. The curved reflective pancake optical combiner 350 includes a curved polarisation-dependent reflector 354, a curved retarder 356, and a curved optically-powered reflector 358. The curved VPH 340, the curved polarisation-dependent reflector 354, and the curved retarder 356 may be arrange in a zero optical power meniscus i.e. the curvature of the curved VPH 340, the curved polarisation-dependent reflector 354, and the curved retarder 356 may be selected to have zero optical power. One of skill in the art will understand that such a quasi-monocentric eyepiece 314 may have an improved optical performance relative to the eyepiece 14 described above with reference to FIGS. 2A, 2B, 2C, 3A, and 4. For example, the quasi-monocentric eyepiece 314 may have a larger field of view, a higher resolution and a larger eyebox. However, the quasi-monocentric eyepiece 314 may be less practical and more difficult to manufacture than the eyepiece 14.

Figure 7:
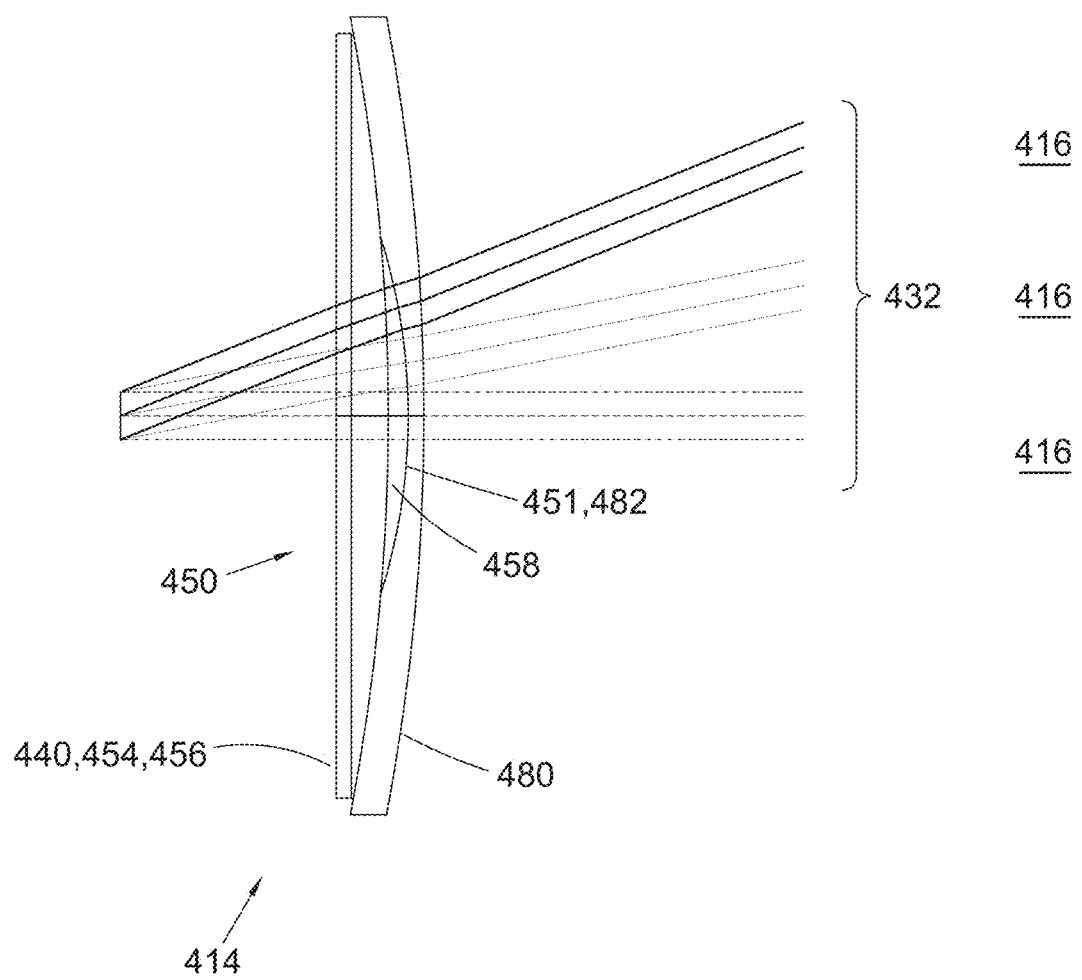
FIG. 7 is a schematic illustration of an alternative eyepiece for the head-mounted AR display of FIG. 1 which includes a lens in use transmitting ambient light towards the eye of a user.

FIG. 7 shows an alternative eyepiece 414 for use in the optical system 10 in place of the eyepiece 14. The alternative eyepiece 414 includes a VPH 440, a lens 480, and a reflective pancake optical combiner 450 located between the VPH 440 and the lens 480. The reflective pancake optical combiner 450 includes a polarisation-dependent reflector 454 adjacent to the VPH 440, an optically-powered reflector 458 adjacent to the lens 480, and a retarder 456 located between the polarisation-dependent reflector 454 and the optically-powered reflector 458. As shown in FIG. 7, the optically-powered reflector 458 is located within a recess formed in a rear side 482 of the lens 480 and a front side 451 of the optically-powered reflector 458 is attached to the rear side 482 of the lens 480.

In use, ambient light is transmitted by the lens 480 and is incident on the optical combiner 450 through the front side 451 of the optically-powered reflector 458 which defines the front side of the optical combiner 450 before exiting the optical combiner 450 through a rear side of the optical combiner 450. Image light is incident on the VPH 440 and is spread by the VPH 440. The spread image light is incident on the rear side of the optical combiner 450 and traverses the optical combiner 450 four times before exiting the optical combiner 450 through the rear side of the optical combiner 450. It should be understood that the alternative eyepiece 414 operates in much the same way as the eyepiece 14 described above with reference to FIGS. 1, 2A, 2B, 2C, and 4 except that the divergence of the spread image light which exits the optical combiner 450 through the rear side of the optical combiner 450 is controlled by the optically-powered reflector 458, whereas the divergence of the ambient light 432 which exits the optical combiner 450 through the rear side of the optical combiner 450 is controlled by the lens 480 in combination with the optically-powered reflector 458.

In the embodiment of FIG. 7, the ambient light 432 is transmitted through the eyepiece 414 and exits the eyepiece 414 as collimated light. Although not shown in FIG. 7, it should be understood that the image light which is reflected by the eyepiece 414 is also collimated so that the image of the scene 416 which is formed by the transmitted ambient light 432 on a user's retina and the image formed by the reflected image light on the user's retina are both in focus at the same time. However, it should be understood that, in general, the ambient light 432 is transmitted through the eyepiece 414 and exits the eyepiece 414 as light which is collimated, divergent or convergent and that the image light which is reflected by the eyepiece 414 is similarly collimated, divergent or convergent so that the image of the scene 416 which is formed by the transmitted ambient light 432 on a user's retina and the image formed by the reflected image light on the user's retina both appear to be in focus at the same time because the scene 416 and the surface of the VPH 440 upon which the image light is focused both lie within a depth of field of the user's eye. Moreover, it should be understood that the combined optical power of the lens 480 and the optical combiner 450 may be selected according to the user's prescription.

Referring now to FIG. 8A there is shown an alternative eyepiece 514 for use in the optical system 10 in place of the eyepiece 14. The alternative eyepiece 514 includes a transmissive fan-out VPH 540, a reflective pancake optical combiner 550 and an optical waveguide 590. The reflective pancake optical combiner 550 includes a polarisation-dependent reflector 554, a retarder 556, and an optically-powered reflector 558. As shown in FIG. 8A, the optical waveguide 590 is disposed on, and attached to, a rear side of the VPH 540 and is configured to guide image light 518 along a path from a position at, or adjacent to, an edge or periphery of the eyepiece 514 to the VPH 540 at a position at, or near, a centre of the eyepiece 514 whereupon the VPH 540 transmits and spreads or fans-out the image light 518 to generate spread image light which is subsequently incident on a rear side of the reflective pancake optical combiner 550 for combination with ambient light which is incident on a front side of the reflective pancake optical combiner 550.

Referring now to FIG. 8B there is shown an alternative eyepiece 614 for use in the optical system 10 in place of the eyepiece 14. The alternative eyepiece 614 includes a reflective fan-out VPH 640, a reflective pancake optical combiner 650 and an optical waveguide 690. The reflective pancake optical combiner 650 includes a polarisation-dependent reflector 654, a retarder 656, and an optically-powered reflector 658. As shown in FIG. 8B, the optical waveguide 690 is disposed on, and attached to, a rear side of the reflective pancake optical combiner 650 and is configured to guide image light 618 along a path from a position at, or adjacent to, an edge or a periphery of the eyepiece 614 to the VPH 640 at a position at, or near, a centre of the eyepiece 614 whereupon the VPH 640 reflects and spreads or fans-out the image light 618 to generate spread image light which travels through a thickness of the optical waveguide 690 and is subsequently incident on a rear side of the reflective pancake optical combiner 650 for combination with ambient light which is incident on a front side of the reflective pancake optical combiner 650.

Figure 9:
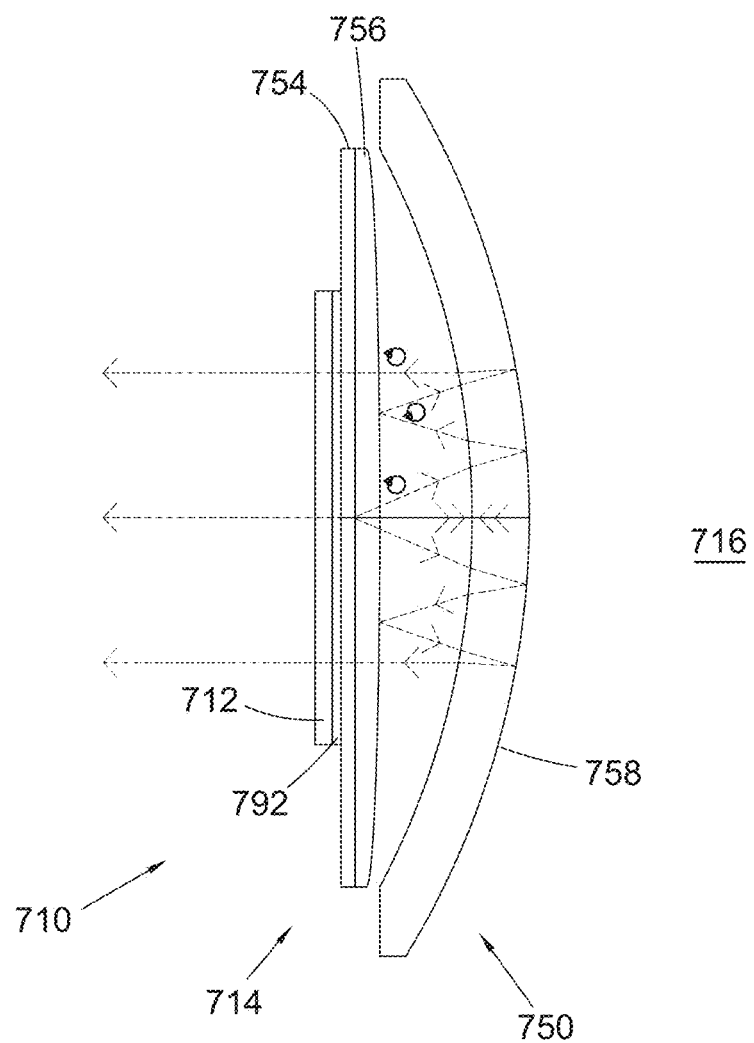
FIG. 9 is a schematic illustration of an alternative optical system for the head-mounted AR display of FIG. 1, the alternative optical system including a transparent image generator in the form of a transparent display.

Referring now to FIG. 9 there is shown an alternative optical system 710 for use in place of the optical system 10. The alternative optical system 710 includes an alternative eyepiece 714. The alternative eyepiece 714 includes an image generator in the form of a transparent OLED display 712. The alternative eyepiece 714 further includes a linear polariser 792 and a reflective pancake optical combiner 750. The reflective pancake optical combiner 750 includes a polarisation-dependent reflector 754, a retarder 756, and an optically-powered reflector 758.

In use, the transparent display 712 emits divergent or spread image light which is polarised by the linear polariser 792 before being incident on a rear side of the reflective pancake optical combiner 750. The reflective pancake optical combiner 750 reflects and collimates the spread image light. The collimated light passes through the transparent display 712 so as to replicate the exit pupil and thereby expand the eyebox. Although not shown in FIG. 9, the reflective pancake optical combiner 750 also transmits ambient light from a scene 716 in front of the eyepiece 714 to the plane in which the exit pupils and the expanded eyebox are located without aberration of the ambient light.

Figure 10A:
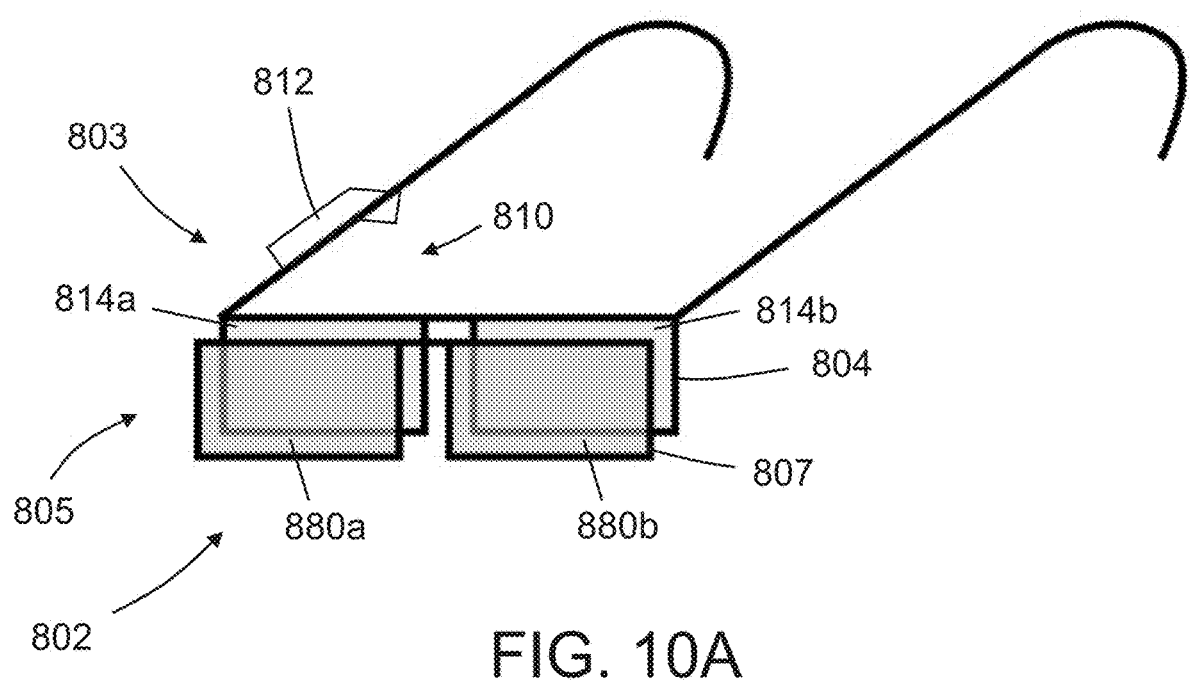
FIG. 10A is a schematic perspective view of a first alternative wearable AR display comprising user-side and world-side eyepieces.
Figure 10B:
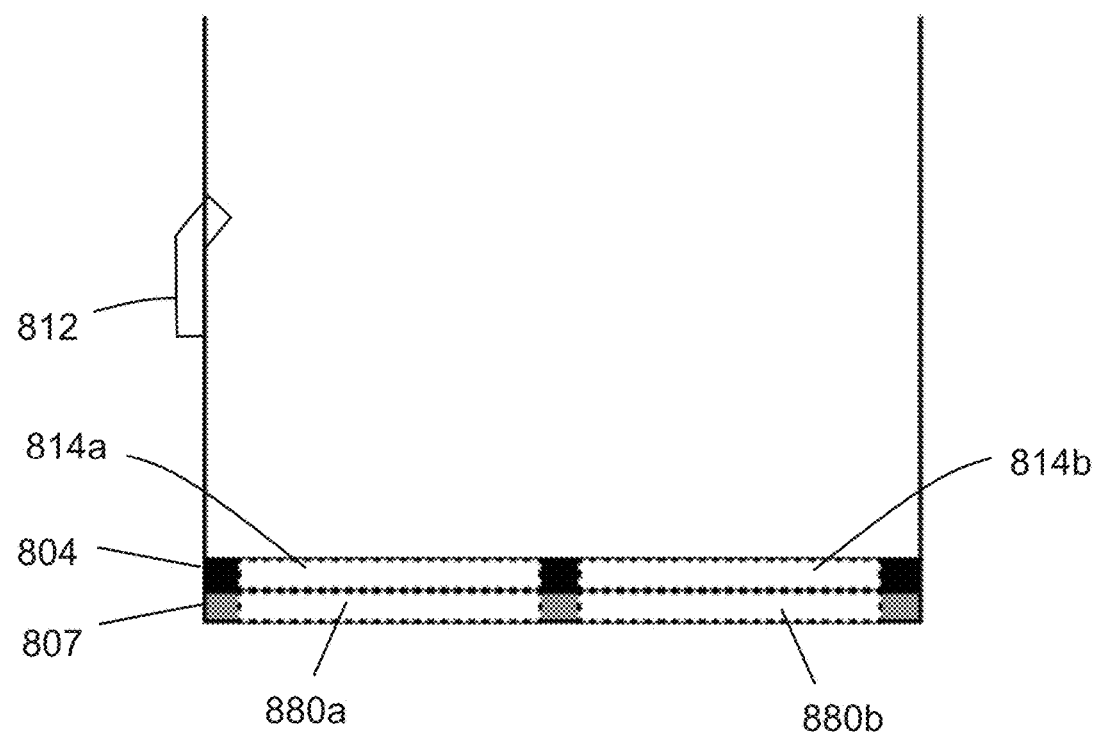
FIG. 10B is a schematic plan view of the first alternative wearable AR display of FIG. 10A.

Referring now to FIGS. 10A and 10B there is shown a first alternative wearable AR display 802 comprising a user-side arrangement 803 and a world-side arrangement 805.

The user-side arrangement 803 includes a user-side support frame 804 and an optical system 810 in the form of an off-axis retinal scanning display mounted on a right leg of the user-side support frame 804. The optical system 810 includes an image generator in the form of a scanning laser projector 812 and a first user-side eyepiece 814a mounted on the user-side support frame 804 for location in front of a user's right eye. The user-side arrangement 803 further includes a second user-side eyepiece 814b mounted on the user-side support frame 804 for location in front of the user's left eye.

The world-side arrangement 805 includes a world-side support frame 807 and world-side eyepieces in the form of first and second lenses 880a and 880b respectively mounted on the world-side support frame 807. The world-side support frame 807 is reconfigurable between a first configuration in which the world-side support frame 807 is held in place in front of the user-side support frame 804 so as to hold each lens 880a, 880b in a line of sight between a scene and a user's eye in front of the corresponding user-side eyepiece 814a, 814b and a second configuration in which each lens 880a, 880b is positioned out of the line of sight. For example, the world-side support frame 807 may be configured to be detachably attached, for example clipped, to the user-side support frame 804 in front of the user-side support frame 804 so as to position and hold the lenses 880a and 880b in place in front of the user-side eyepieces 814a and 814b respectively. For example, the user-side and world-side support frames 804, 807 may include one or more fastener arrangements (not shown explicitly in FIGS. 10A and 10B) such as one or more clip arrangements, one or more magnetic arrangements, one or more hook arrangements and/or one or more latch arrangements for this purpose. Alternatively, the world-side support frame 807 may be attached to the user-side support frame 804 by one or more hinges to enable the world-side support frame 807 to be rotated into position and held in front of the user-side support frame 804 so as to position the lenses 880a and 880b in front of the user-side eyepieces 814a and 814b respectively.

Figure 11:
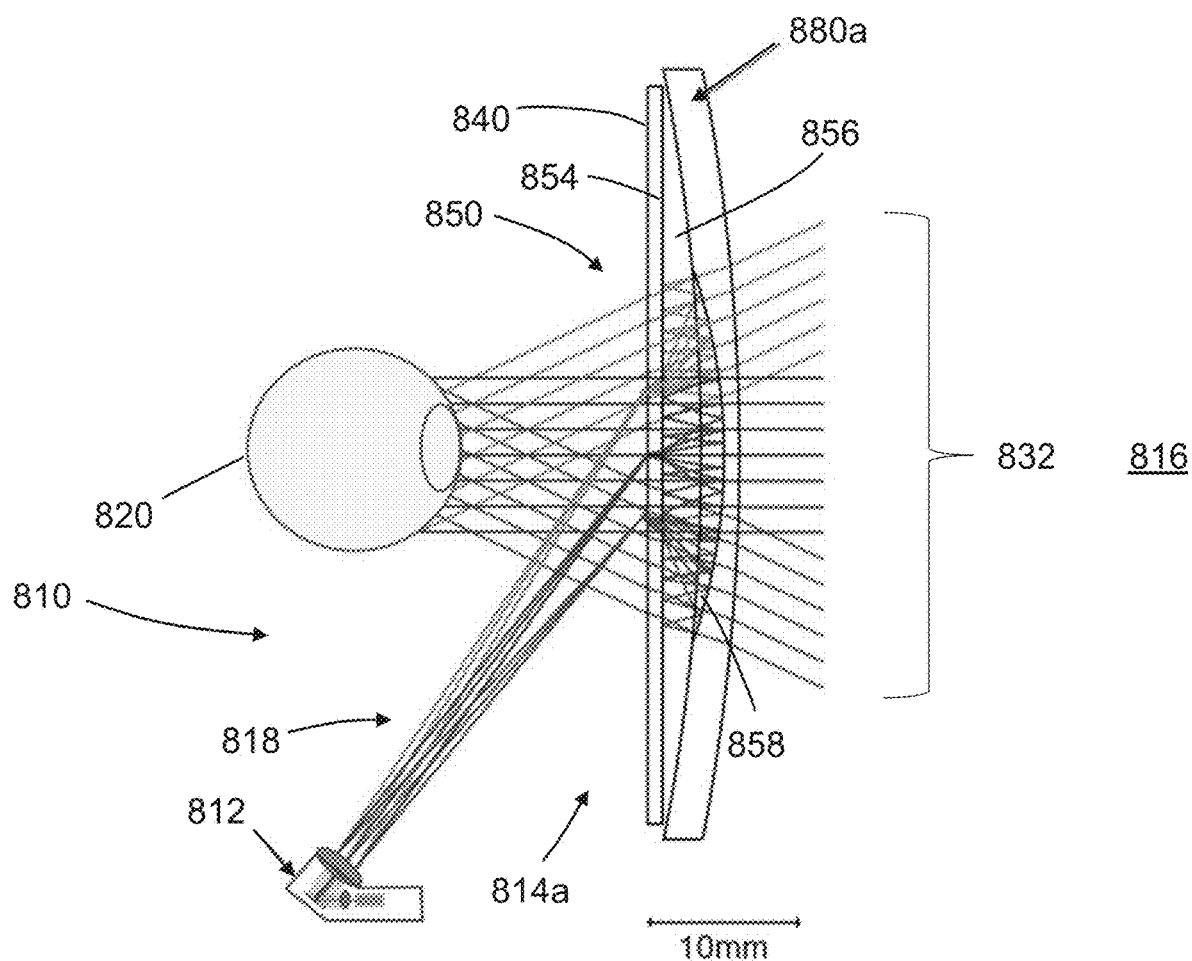
FIG. 11 is a schematic illustration of a user-side eyepiece and a corresponding world-side eyepiece of the head-mounted AR display of FIGS. 10A and 10B in use.

FIG. 11 shows the optical system 810 including the first user-side eyepiece 814a in more detail together with the corresponding first lens 880a after the first lens 880a has been positioned in front of the user-side eyepiece 814a. The user-side eyepiece 814a includes a VPH 840, and a reflective pancake optical combiner 850 located in front of the VPH 840. The reflective pancake optical combiner 850 includes a polarisation-dependent reflector 854 adjacent to the VPH 840, an optically-powered reflector 858, and a retarder 856 located between the polarisation-dependent reflector 854 and the optically-powered reflector 858. The optically-powered reflector 858 may be positioned within a recess formed in a rear side of the first lens 880a.

It should be understood that the second user-side eyepiece 814b may have the same optical power as the first user-side eyepiece 814a. For example, the second user-side eyepiece 814b may be identical to the first user-side eyepiece 814a. Alternatively, the second user-side eyepiece 814b may have the same optical power as the first user-side eyepiece 814a but the second user-side eyepiece 814b may have neither a VPH like VPH 840 nor a reflective pancake optical combiner like the reflective pancake optical combiner 850.

In use, the optical system 810 operates in the same way as the optical system 10 described above with reference to FIG. 1 when using the eyepiece 414 described with reference to FIG. 7. More specifically, when the user-side support frame 804 is mounted on the head of a user with the first user-side eyepiece 814a and the first lens 880a positioned in a field of view of the user, the first lens 880a and the first user-side eyepiece 814a transmit ambient light 832 from a scene 816 located in front of the first lens 880a through the first lens 880a and the first user-side eyepiece 814a to an eye 820 of a user located behind the first user-side eyepiece 814a and the projector 812 projects linearly-polarised image light 818 defining an image towards the eye 820 of the user by way of the first user-side eyepiece 814a. The linearly-polarised image light 818 may include one or more different wavelengths such as one or more of red light, green light or blue light. The first user-side eyepiece 814a replicates the image defined by the projected image light a number of times at a plurality of positions in a plane at the eye 820 of the user to expand an eyebox of the wearable AR display 802.

The ambient light is transmitted by the first lens 880a and is incident on the optical combiner 850 through a front side of the optically-powered reflector 858 which defines the front side of the optical combiner 850 before exiting the optical combiner 850 through a rear side of the optical combiner 850. Image light is incident on the VPH 840 and is spread by the VPH 840. The spread image light is incident on the rear side of the optical combiner 850 and traverses the optical combiner 850 four times before exiting the optical combiner 850 through the rear side of the optical combiner 850. It should be understood that the first user-side eyepiece 814a operates in much the same way as the eyepiece 14 described above with reference to FIGS. 1, 2A, 2B, 2C, and 4 except that the divergence of the spread image light which exits the optical combiner 850 through the rear side of the optical combiner 850 is controlled by the optically-powered reflector 858, whereas the divergence of the ambient light 832 which exits the optical combiner 850 through the rear side of the optical combiner 850 is controlled by the first lens 880a in combination with the optically-powered reflector 858 of the first user-side eyepiece 814a.

In the embodiment of FIG. 11, the ambient light 832 is transmitted through the eyepiece 814a and exits the eyepiece 814a as collimated light and that the image light which is reflected by the eyepiece 814a is also collimated so that the image of the scene 816 which is formed by the transmitted ambient light 832 on a user's retina and the image formed by the reflected image light on the user's retina are both in focus at the same time. However, it should be understood that, in general, the ambient light 832 is transmitted through the eyepiece 814a and exits the eyepiece 814a as light which is collimated, divergent or convergent and that the image light which is reflected by the eyepiece 814a is similarly collimated, divergent or convergent so that the image of the scene 816 which is formed by the transmitted ambient light 832 on the user's retina and the image formed by the reflected image light on the user's retina both appear to be in focus at the same time because the scene 816 and the surface of the VPH 840 upon which the image light 818 is focussed both lie within a depth of field of the user's eye. Moreover, it should be understood that the combined optical power of the first lens 880a and the optically-powered reflector 858 of the first user-side eyepiece 814a may be selected according to the user's prescription.

Moreover, it should also be understood that the position of the world-side support frame 807, and therefore also of the lenses 880a, 880b, is adjustable relative to the user-side support frame 804 and the user-side eyepieces 814a, 814b to facilitate a precise alignment of the lenses 880a, 880b relative to the user-side eyepieces 814a, 814b as required for alignment of the image formed by the projected laser light and the image of the scene formed by the ambient light on the eye 820 of the user. For example, the world-side support frame 807 and/or the user-side support frame 804 may be configured for adjustment of the position of the world-side support frame 807, and therefore also of the lenses 880a, 880b, relative to the user-side support frame 804 and the user-side eyepieces 814a, 814b for this purpose. For example, the one or more fastener arrangements or the one or more hinge arrangements between the user-side support frame 804 and the world-side support frame 807 may be configured to enable translation in x, y and/or z and/or to enable rotation of the one or more fastener arrangements or the one or more hinge arrangements relative to the user-side support frame 804 or the world-side support frame 807 for translation and/or rotation of the world-side support frame 807 relative to the user-side support frame 804.

From the foregoing description, one of ordinary skill in the art will understand that the AR functionality of the wearable AR display 802 may be deactivated if desired so that the wearable AR display 802 serves only as a pair of prescription glasses.

Moreover, use of such a user-side support frame 804, such user-side eyepieces 814a and 814b, such a world-side support frame 807, and such lenses 880a, 880b, means that the user-side support frame 804 and the user-side eyepieces 814a, 814b can be generic (or may have a limited number of different sizes and/or shapes) whilst the lenses 880a, 880b and/or the world-side support frame 807 can be tailored or customized according to the user's requirements and/or preferences. For example, as described above, one or both of the lenses 880a and 880b may be tailored or customized according to the user's prescription. Alternatively, one or both of the world-side eyepieces may not have any optical power. One or both of the world-side eyepieces may act as an optical filter. One or both of the world-side eyepieces may be tinted. One or both of the world-side eyepieces may be polarising. One or both of the world-side eyepieces may be electrochromic. A power supply for one or both electrochromic world-side eyepieces may be attached to the user-side support frame 804, and the user-side support frame 804 and the world-side support frame 807 may be configured to provide an electrical connection therebetween, for example at one or more of the fasteners or hinges between the user-side support frame 804 and the world-side support frame 807. The world-side support frame 807 can be tailored or customized according to the user's requirements and/or preferences. For example, a size, shape and/or style of the world-side support frame 807 can be selected according to the user's requirements and/or preferences.

Additionally, use of such a user-side support frame 804, such user-side eyepieces 814*a* and 814*b*, such a world-side support frame 807, and such world-side eyepieces, means that each of the user-side support frame 804, the user-side eyepieces 814*a*, 814*b*, the world-side support frame 807 and the world-side eyepieces can be easily accessible. This may, for example make cleaning of the user-side support frame 804, the user-side eyepieces 814*a*, 814*b*, the world-side support frame 807 and the world-side eyepieces easier.

Figure 12A:
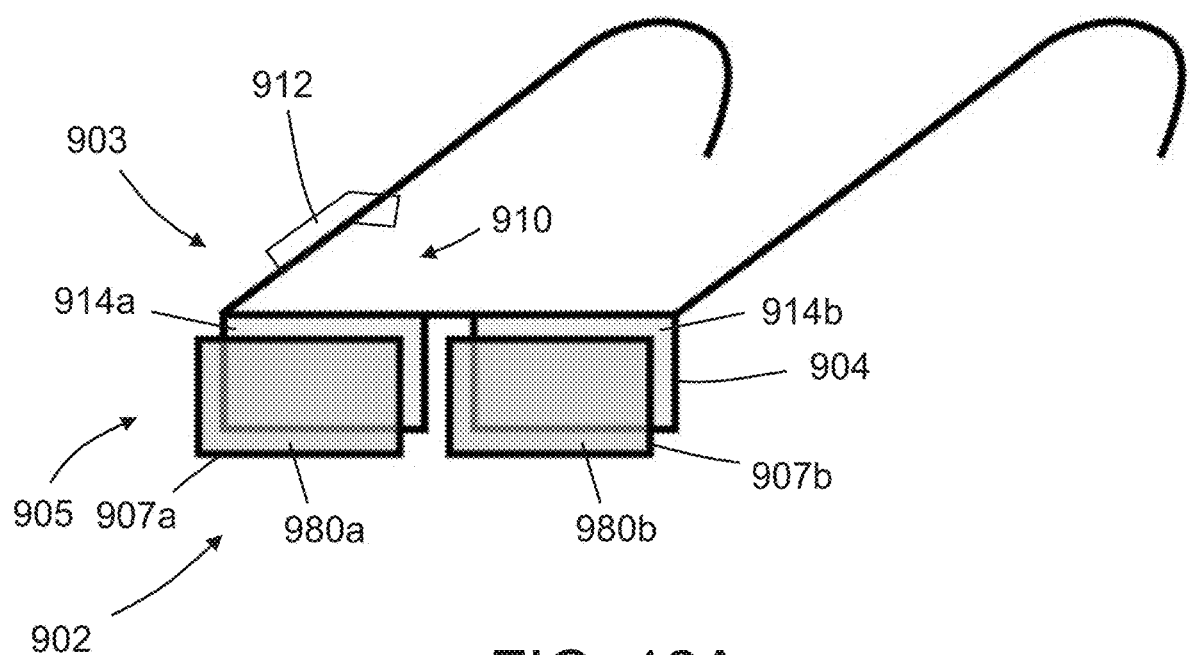
FIG. 12A is a schematic perspective view of a second alternative wearable AR display comprising user-side and world-side eyepieces.
Figure 12B:
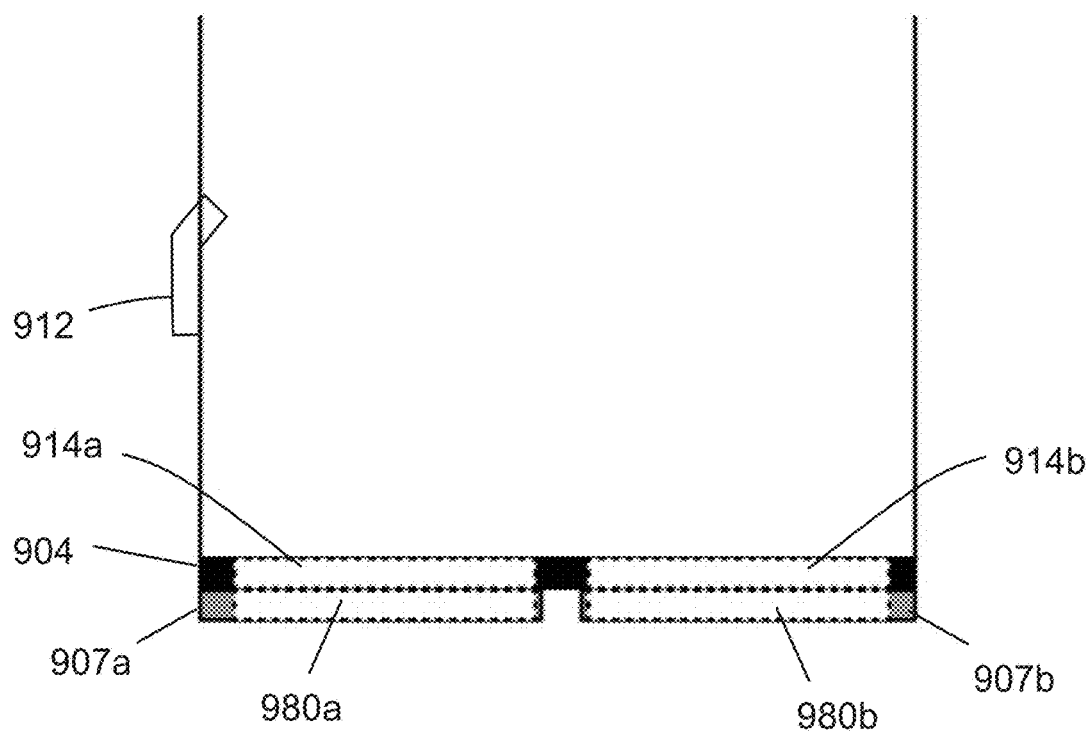
FIG. 12B is a schematic plan view of the second alternative wearable AR display of FIG. 12A.

Referring now to FIGS. 12A and 12B there is shown a second alternative wearable AR display 902 comprising a user-side arrangement 903 and a world-side arrangement 905.

The user-side arrangement 903 includes a user-side support frame 904 and an optical system 910 in the form of an off-axis retinal scanning display mounted on a right leg of the user-side support frame 904. The optical system 910 includes an image generator in the form of a scanning laser projector 912 and a first user-side eyepiece 914*a* mounted on the user-side support frame 904 for location in front of a user's right eye. The user-side arrangement 903 further includes a second user-side eyepiece 914*b* mounted on the user-side support frame 904 for location in front of the user's left eye.

The world-side arrangement 905 includes a first world-side support frame 907*a* and a first world-side eyepiece in the form of a first lens 980*a* mounted on the first world-side support frame 907*a*. The first world-side support frame 907*a* is reconfigurable between a first configuration in which the first world-side support frame 907*a* is held in place in front of the user-side support frame 904 so as to hold the first lens 980*a* in a line of sight between a scene and a user's eye in front of the first user-side eyepiece 914*a* and a second configuration in which the first lens 980*a* is positioned out of the line of sight. For example, the first world-side support frame 907*a* may be configured to be detachably attached, for example clipped, to the user-side support frame 904 in front of the user-side support frame 904 so as to position and hold the first lens 980*a* in place in front of the first user-side eyepiece 914*a*. For example, the user-side support frame 904 and the first world-side support frame 907*a* may include one or more fastener arrangements (not shown explicitly in FIGS. 12A and 12B) such as one or more clip arrangements, one or more magnetic arrangements, one or more hook arrangements and/or one or more latch arrangements for this purpose. Alternatively, the first world-side support frame 907*a* may be attached to the user-side support frame 904 by one or more hinges to enable the first world-side support frame 907*a* to be rotated into position in front of the user-side support frame 904 so as to position and hold the first lens 980*a* in front of the first user-side eyepiece 914*a*.

Similarly, the world-side arrangement 905 includes a second world-side support frame 907*b* and a second world-side eyepiece in the form of a second lens 980*b* mounted on the second world-side support frame 907*b*. The second world-side support frame 907*a* is reconfigurable between a first configuration in which the second world-side support frame 907*a* is held in place in front of the user-side support frame 904 so as to hold the second lens 980*b* in a line of sight between a scene and a user's eye in front of the second user-side eyepiece 914*b* and a second configuration in which the second lens 980*b* is positioned out of the line of sight. For example, the second world-side support frame 907*b* may be configured to be detachably attached, for example clipped, to the user-side support frame 904 in front of the user-side support frame 904 so as to position and hold the second lens 980*b* in place in front of the second user-side eyepiece 914*b*. For example, the user-side support frame 904 and the second world-side support frame 907*b* may include one or more fastener arrangements (not shown explicitly in FIGS. 12A and 12B) such as one or more clip arrangements, one or more magnetic arrangements, one or more hook arrangements and/or one or more latch arrangements for this purpose. Alternatively, the second world-side support frame 907*b* may be attached to the user-side support frame 904 by one or more hinges to enable the second world-side support frame 907*b* to be rotated into position in front of the user-side support frame 904 so as to position and hold the second lens 980*b* in front of the second user-side eyepiece 914*b*.

It should be understood that the first user-side eyepiece 914*a* includes a VPH (not shown explicitly in FIGS. 12A and 12B) and a reflective pancake optical combiner (not shown explicitly in FIGS. 12A and 12B) like the first user-side eyepiece 814*a* of the first alternative wearable AR display 802 described above with reference to FIGS. 10A, 10B, and 11. It should also be understood that the second user-side eyepiece 914*b* may have the same optical power as the first user-side eyepiece 914*a*. For example, the second user-side eyepiece 914*b* may be identical to the first user-side eyepiece 914*a*. Alternatively, the second user-side eyepiece 914*b* may have the same optical power as the first user-side eyepiece 914*a* but may have neither a VPH nor a reflective pancake optical combiner.

Figure 13A:
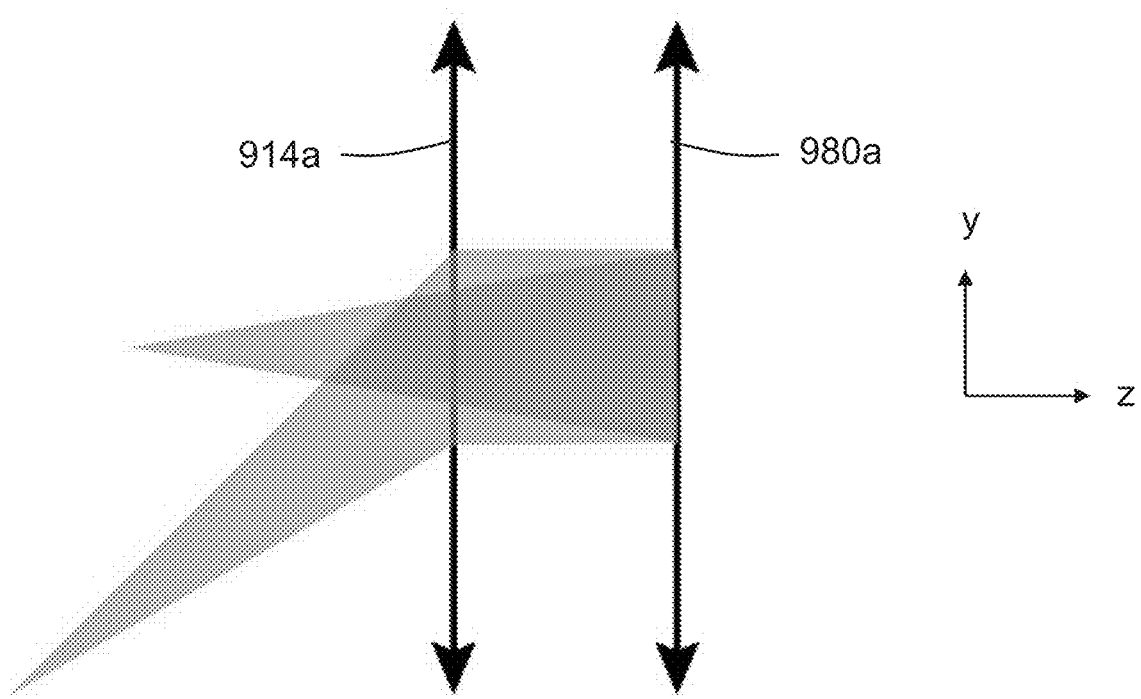
FIG. 13A is a schematic side view of a user-side eyepiece and a corresponding world-side eyepiece of the second alternative wearable AR display of FIGS. 12A and 12B when the user-side eyepiece and the corresponding world-side eyepiece are aligned in a y-direction.
Figure 13B:
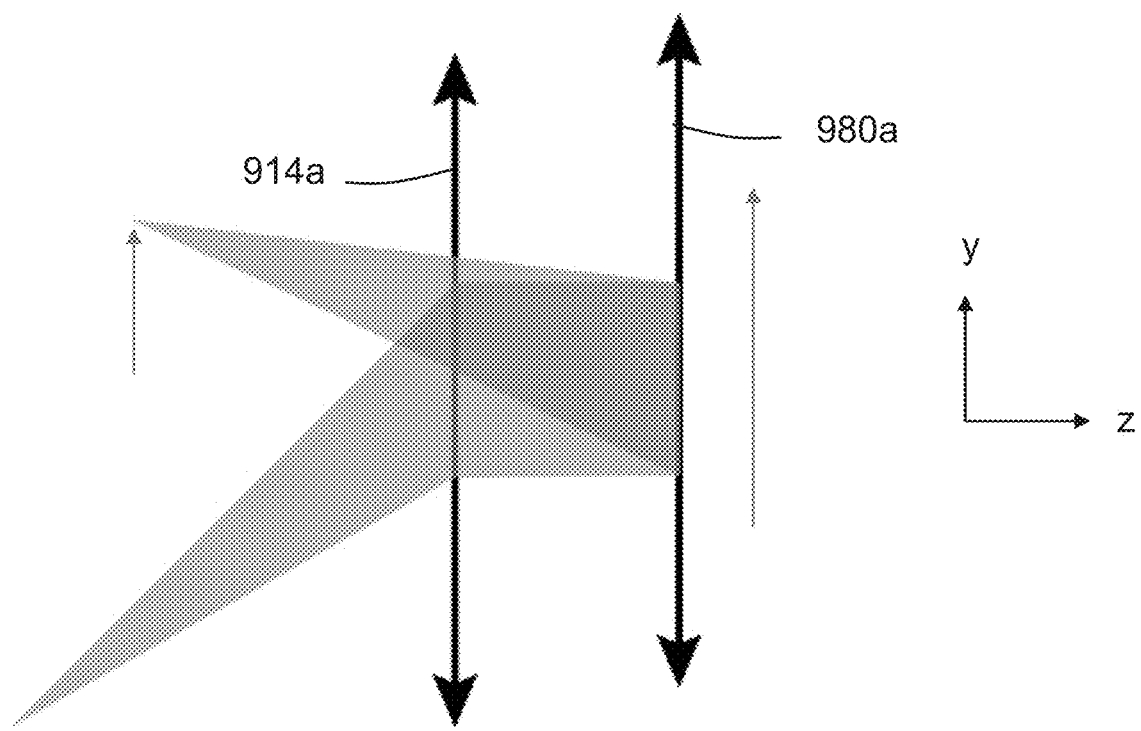
FIG. 13B is a schematic side view of the user-side eyepiece and the corresponding world-side eyepiece of FIG. 13A after the world-side eyepiece is shifted in the y-direction relative to the user-side eyepiece illustrating the resulting shift in the position of the eyebox in the y-direction.

It should be understood that, in contrast to the first alternative wearable AR display 802 described with reference to FIGS. 10A, 10B and 11, the second alternative wearable AR display 902 enables each of the world-side eyepieces 980*a*, 980*b* to be positioned independently relative to the corresponding user-side eyepiece 914*a*, 914*b*. For example, the one or more fastener arrangements or the one or more hinge arrangements between the user-side support frame 904 and the first world-side support frame 907*a* may be configured to enable translation in x, y and/or z and/or to enable rotation of the one or more fastener arrangements or the one or more hinge arrangements relative to the user-side support frame 904 or the first world-side support frame 907*a* for translation and/or rotation of the first world-side support frame 907*a* and the first world-side eyepiece 980*a* relative to the user-side support frame 904 and the first user-side eyepiece 914*a*. For example, as may be appreciated by comparing FIGS. 13A and 13B, a shift in y of the first world-side support frame 907*a* and the first world-side eyepiece 980*a* relative to the user-side support frame 904 and the first user-side eyepiece 914*a* may allow for small adjustments in a height of the eyebox. Similarly, a shift in x of the first world-side support frame 907*a* and the first world-side eyepiece 980*a* relative to the user-side support frame 904 and the first user-side eyepiece 914*a* may result in a small shift in horizontal position of the eyebox i.e. in the inter-pupillary distance (IPD).

Similarly, the one or more fastener arrangements or the one or more hinge arrangements between the user-side support frame 904 and the second world-side support frame 907*b* may be configured to enable translation and/or rotation of the one or more fastener arrangements or the one or more hinge arrangements relative to the user-side support frame 904 or the second world-side support frame 907b for translation in x, y and/or z and/or to enable rotation of the second world-side support frame 907b and the second world-side eyepiece 980b relative to the user-side support frame 904 and the second user-side eyepiece 914b.

In order to achieve a larger range of adjustment of the eyebox in x or y, the user-side support frame 904 and the first and second user-side eyepieces 914a, 914b might have to selected from a group of standard sizes (e.g. small, medium, and large) for a coarse adjustment in x or y.

In other respects, the optical system 910 described with reference to FIGS. 12A, 12B, 13A and 13B operates in the same way as the optical system 810 described above with reference to FIGS. 10A, 10B and 11.

One of ordinary skill in the art will also understand that various modifications are possible to any of the optical systems described above. For example, although each of the optical systems described with reference to FIGS. 1 to 11 is configured so that ambient light which exits the optical combiner through the rear side of the optical combiner is collimated and so that the spread image light which exits the optical combiner through the rear side of the optical combiner is collimated, in an alternative variant of any of the optical systems described above, the optical system may be configured so that the ambient light which exits the optical combiner through the rear side of the optical combiner may be divergent or convergent and/or the spread image light which exits the optical combiner through the rear side of the optical combiner may be divergent or convergent. The optical system may be configured so that the divergence of the ambient light exiting the optical combiner from the rear side of the optical combiner and the divergence of the spread image light exiting the optical combiner from the rear side of the optical combiner are comparable or the same. For example, the ambient light exiting the optical combiner from the rear side of the optical combiner and the spread image light exiting the optical combiner from the rear side of the optical combiner may be similarly divergent, similarly convergent or similarly collimated.

Although the retarder 56 and the optically-powered reflector 58 of the optical combiner 50 of FIG. 4 are separated by an air gap 64, in an alternative optical combiner, a solid transparent member or a solid transparent material may be located between the retarder 56 and the optically-powered reflector 58, for example the retarder 56 and the optically-powered reflector 58 may be separated by a solid transparent member or a solid transparent material. Similarly, in any of the optical combiners 250, 350, 450, 550, 650, 750, any of the retarders 256, 356, 456, 556, 656, 756 and the corresponding optically-powered reflectors 258, 358, 458, 558, 658, 758 respectively may be separated by an air gap. A solid transparent member or a solid transparent material may be located between any of the retarders 256, 356, 456, 556, 656, 756 and the corresponding optically-powered reflectors 258, 358, 458, 558, 658, 758 respectively. For example, any of the retarders 256, 356, 456, 556, 656, 756 and the corresponding optically-powered reflectors 258, 358, 458, 558, 658, 758 respectively may be separated by a solid transparent member or a solid transparent material.

Although each of the optically-powered reflectors 58, 258, 358, 458, 558, 658, 758 is a curved mirror, in other optical combiner variants, the optically-powered reflector may comprise a Fresnel reflector or a diffractive mirror such as a volume phase hologram or a polarisation volume grating.

Although the optical system 10 of FIG. 2B is described as including an image generator in the form of an off-axis scanning laser projector 12, other optical system embodiments may include an image generator of a different kind. For example, other optical system embodiments may include an image projector of any kind for projecting the image light. Other optical system embodiments may include a scanning laser projector of any kind. Other optical system embodiments may include an LED-based projector such as an LED-LCOS projector or a micro-LED projector. Other optical system embodiments may include a digital micro-mirror array projector or a digital light processing (DLP) projector.

Although the optical combiner 50 of FIGS. 2A, 2B, 2C and 4, is described as including a circular polarizer 70 on an outer surface of the optically-powered reflector 58, other optical combiner embodiments may not include any such circular polarizer.

Although each of the optically-powered reflectors 58, 258, 358, 458, 558, 658, 758 is a dichroic optically-powered reflector, in other optical combiner variants, the optically-powered reflector may be a partially-reflecting optically-powered reflector. For example, the optically-powered reflector may include a partially-reflecting coating such as a 50:50 coating and/or a half-silvered coating.

Although each of the polarisation-dependent reflectors 54, 254, 354, 454, 554, 654, 754 is described above as being configured to only reflect light of a predetermined linear polarisation, other optical combiner variants may include a polarisation-dependent reflector which is configured to only reflect light of a predetermined polarisation state of a kind other than a predetermined linear polarisation. For example, another optical combiner variant may include a polarisation-dependent reflector which is configured to only reflect light of a predetermined circular polarisation. In such an optical combiner variant, the polarisation-dependent reflector may comprise a chiral mirror. Such an optical combiner variant may include a retarder such as a quarter-wave plate. Alternatively, such an optical combiner variant may not include a retarder of any kind because the handedness of the circular polarization flips upon reflection from the optically-powered reflector so that the spread image light traverses such an optical combiner variant four times between the chiral mirror and the optically-powered reflector even in the absence of a quarter-wave plate between the chiral mirror and the optically-powered reflector. In an optical system variant which includes such an optical combiner variant, the optical system variant may comprise a polarisation controller located between the image generator and the optical spreader, wherein the polarisation controller is configured to convert the image light to circularly polarised light. Alternatively, in another optical system variant which includes such an optical combiner variant, the optical system variant may comprise a polarisation controller located between the optical spreader and the optical combiner, wherein the polarisation controller is configured to convert the spread image light to circularly polarised light. The polarisation controller may comprise a circular polariser and/or comprise, or be configured to act as, a quarter-wave plate. Such optical system variants may comprise an optically-powered reflector having a linear polariser on an outer surface thereof for linearly polarising ambient light. Such a linear polariser may be used to linearly polarise ambient light when the polarisation-dependent reflector is configured to only reflect light of a predetermined circular polarisation and when the optical combiner comprises a quarter-wave plate so that the ambient light arrives at the polarisation-dependent reflector with the appropriate predetermined circular polarisation to ensure that the circularly-polarised ambient light is transmitted by the polarisation-dependent reflector.

In the optical system 10, the optical spreader 40 is located between the image generator 12 and the optical combiner 50. In a further variant of the optical system 10, the optical spreader may be located within, or form part of, the optical combiner. For example, the optical spreader may be located between the polarisation-dependent reflector and the optically-powered reflector. For example, the optical spreader may be located between the polarisation-dependent reflector and the retarder, or the optical spreader may be located between the retarder and the optically-powered reflector.

Although the optical systems 10, 710 have been described above for use as part of a wearable AR display 2, the optical systems 10, 710 could instead be configured for use in a vehicle, such as a terrestrial vehicle or an aircraft. For example, rather than the optical combiner 50, 250, 350, 450, 650, 750 being incorporated into an eyepiece 14, 114, 214, 314, 414, 514, 614, 714, the optical combiner 50, 250, 350, 450, 650, 750 may be incorporated into a windscreen of a vehicle. Optionally, the optical spreader 40, 140, 240, 340, 440, 540, 640 may be incorporated into the windscreen of the vehicle. Optionally, the transparent display 712 may be incorporated into the windscreen of the vehicle.

Although optical systems 10, 810, 910 are described above in which a scanning laser projector 12, 812, 912 is attached to the right leg of a user-side support frame 4, 804, 904 and is aligned with a first right-hand user-side eyepiece 14, 814a, 914a which includes a VPH and a reflective pancake optical combiner, it should be understood that the scanning laser projector 12, 812, 912 may be attached to the left leg of the user-side support frame 4, 804, 904 and may be aligned with a second left-hand user-side eyepiece 15, 814b, 914b which includes a VPH and a reflective pancake optical combiner.

In a variant of the eyepiece 414 of FIG. 7, one or more of the VPH 440, the polarisation-dependent reflector 454, and the retarder 456 may be optically powered. For example, one or more of the VPH 440, the polarisation-dependent reflector 454, and the retarder 456 may be curved. Moreover, the configuration of one or more of the VPH 440, the polarisation-dependent reflector 454, the retarder 456, and the optically-powered reflector 458 may be selected to adjust the associated optical power and thereby control the divergence of the spread image light exiting the eyepiece 414 through the rear side of the eyepiece 414 and to act in concert with the lens 480 to control the divergence of the ambient light 432 exiting the eyepiece 414 through the rear side of the eyepiece 414 according to the user's prescription.

Similarly, in a variant of the user-side eyepiece 814a described with reference to FIGS. 10A, 10B and 11, one or more of the VPH 840, the polarisation-dependent reflector 854, and the retarder 856 may be optically powered. For example, one or more of the VPH 840, the polarisation-dependent reflector 854, and the retarder 856 may be curved. Moreover, the configuration of one or more of the VPH 840, the polarisation-dependent reflector 854, the retarder 856, and the optically-powered reflector 858 may be selected to adjust the associated optical power and thereby control the divergence of the spread image light exiting the user-side eyepiece 814a through the rear side of the user-side eyepiece 814a and to act in concert with the world-side eyepiece 880a to control the divergence of the ambient light 832 exiting the user-side eyepiece 814a through the rear side of the user-side eyepiece 814a according to the user's prescription.

Similarly, in a variant of the user-side eyepiece 914a described with reference to FIGS. 12A, 12B, 13A and 13B, one or more of a VPH, a polarisation-dependent reflector, and a retarder of the user-side eyepiece 914a may be optically powered. For example, one or more of the VPH, the polarisation-dependent reflector, and the retarder of the user-side eyepiece 914a may be curved. Moreover, the configuration of one or more of the VPH, the polarisation-dependent reflector, the retarder, and the optically-powered reflector of the user-side eyepiece 914a may be selected to adjust the associated optical power and thereby control the divergence of the spread image light exiting the user-side eyepiece 914a through the rear side of the user-side eyepiece 914a and to act in concert with the world-side eyepiece 980a to control the divergence of ambient light exiting the user-side eyepiece 914a through the rear side of the user-side eyepiece 914a according to the user's prescription.

Although the disclosure has been described in terms of preferred embodiments as set forth above, it should be understood that these embodiments are illustrative only and that the claims are not limited to those embodiments. Those skilled in the art will be able to make modifications and alternatives to the described embodiments in view of the disclosure which are contemplated as falling within the scope of the appended claims. Each feature disclosed or illustrated in the present specification may be incorporated in any embodiment, whether alone or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of reference signs in the claims should not be construed as limiting the scope of the claims.

LIST OF REFERENCE NUMERALS 2 wearable AR display;
4 support frame;
6 central axis of support frame;
10 optical system;
12 scanning laser projector;
14 eyepiece;
15 further eyepiece;
16 scene;

18 image light;
18a, 18b, 18c principal rays of image light;
20 eye of a user;
20a retina of the eye of the user;
22 plane at the eye of the user;
24 eyebox;
30 collimated light;
32 ambient light;
40 transmissive volume phase hologram (VPH);
50 optical combiner;
51 first side of the optical combiner;
52 second side of the optical combiner;
54 polarisation-dependent reflector;
56 retarder;
58 optically-powered reflector;
60 transparent substrate of optically-powered reflector;
62 dichroic reflective coating;
64 air gap;
70 circular polariser;
114 eyepiece;
124 eyebox;
140 transmissive volume phase hologram (VPH);
214 eyepiece;
240 curved transmissive volume phase hologram (VPH);
250 curved optical combiner;
254 curved polarisation-dependent reflector;
256 curved retarder;
258 curved optically-powered reflector;
314 eyepiece;
340 curved transmissive volume phase hologram (VPH);
350 curved optical combiner;
354 curved polarisation-dependent reflector;
356 curved retarder;
358 curved optically-powered reflector;
414 eyepiece;
416 scene;
432 ambient light;
440 transmissive volume phase hologram (VPH);
450 optical combiner;
451 first side of the optical combiner;
454 polarisation-dependent reflector;
456 retarder;
458 optically-powered reflector;
480 lens;
482 rear side of lens;
514 eyepiece;
518 image light;
540 transmissive volume phase hologram (VPH);
550 optical combiner;
554 polarisation-dependent reflector;
556 retarder;
558 optically-powered reflector;
590 optical waveguide;
614 eyepiece;
618 image light;
640 reflective volume phase hologram (VPH);
650 optical combiner;
654 polarisation-dependent reflector;
656 retarder;
658 optically-powered reflector;
690 optical waveguide;
712 transparent display;
714 eyepiece;
716 scene;
718 image light;
740 transmissive volume phase hologram (VPH);
750 optical combiner;
754 polarisation-dependent reflector;
756 retarder;
758 optically-powered reflector; and
792 linear polariser.
802 wearable AR display;
803 user-side arrangement;
804 user-side support frame;
805 world-side arrangement;
807 world-side support frame;
810 optical system;
812 scanning laser projector;
814a first user-side eyepiece;
814b second user-side eyepiece;
816 scene;
818 image light;
820 eye of a user;
832 ambient light;
840 transmissive volume phase hologram (VPH);
850 optical combiner;
854 polarisation-dependent reflector;
856 retarder;
858 optically-powered reflector;
880a lens;
902 wearable AR display;
903 user-side arrangement;
904 user-side support frame;
905 world-side arrangement;
907a first world-side support frame;
907b second world-side support frame;
910 optical system;
912 scanning laser projector;
914a first user-side eyepiece;
914b second user-side eyepiece;
980a first lens; and
980b second lens.

The invention claimed is:

1. An optical system for an augmented reality (AR) display, the optical system comprising:
an image generator for generating image light; and
an optical combiner for location in a field of view of a user of the optical system between the user and a scene, the optical combiner including an optically-powered reflector located at a first side of the optical combiner and a polarisation-dependent reflector located at a second side of the optical combiner, the second side of the optical combiner being opposite to the first side of the optical combiner,
wherein the optical combiner is configured to transmit ambient light from the scene towards an eye of the user, the ambient light being incident on the first side of the optical combiner,
wherein the image generator and the optical combiner are arranged so that the image light is incident on the second side of the optical combiner, and
wherein the optical combiner is configured to reflect the image light so that the image light traverses the optical combiner four times and exits the optical combiner from the second side of the optical combiner, and the optical combiner is configured to transmit the ambient light so that the ambient light traverses the optical combiner only once and exits the optical combiner from the second side of the optical combiner.

2. The optical system as claimed in claim 1, wherein the optical system is configured so that the ambient light exiting the optical combiner from the second side of the optical combiner is collimated, converging or diverging and/or the image light exiting the optical combiner from the second side of the optical combiner is collimated, converging or diverging and, optionally, wherein the optical system is configured so that the divergence of the ambient light exiting the optical combiner from the second side of the optical combiner and the divergence of the image light exiting the optical combiner from the second side of the optical combiner are comparable or are the same, for example wherein the optical system is configured so that the ambient light exiting the optical combiner from the second side of the optical combiner and the image light exiting the optical combiner from the second side of the optical combiner are similarly convergent, similarly divergent or similarly collimated.

3. The optical system as claimed in claim 1, wherein the optical combiner is, or comprises, a reflective pancake optical combiner and/or wherein the optical combiner is configured to control the divergence of the image light.

4. The optical system as claimed in claim 1, wherein at least one of:
the polarisation-dependent reflector is located at the second side of the optical combiner;
the polarisation-dependent reflector is configured to selectively reflect light according to a polarisation of the light;
the polarisation-dependent reflector is configured to only reflect light of a predetermined polarisation state;
the polarisation-dependent reflector is configured to only reflect light which has a wavelength in one or more narrow spectral bands, each spectral band being arranged around a wavelength of the image light;
the polarisation-dependent reflector is configured to only reflect light of a predetermined linear polarisation; and
the polarisation-dependent reflector comprises a polarizing mirror.

5. The optical system as claimed in claim 1, comprising a retarder, wherein the retarder is located between the polarisation-dependent reflector and the optically-powered reflector and, optionally, wherein the retarder comprises, or is configured to act as, a quarter-wave plate and, optionally, the polarisation-dependent reflector and the retarder are located adjacent to one another, the polarisation-dependent reflector and the retarder engage one another and/or the polarisation-dependent reflector and the retarder are parallel to one another.

6. The optical system as claimed in claim 1, wherein at least one of:
the optically-powered reflector is located at the first side of the optical combiner;
the optically-powered reflector is configured to reflect, and control the divergence of, the image light;
the optically-powered reflector comprises at least one of: a curved mirror, a Fresnel reflector, or a diffractive mirror such as a volume phase hologram or a polarisation volume grating;
the optically-powered reflector is configured to reflect light having a wavelength in one or more spectral bands, each spectral band being arranged around a wavelength of the image light;
the optically-powered reflector is configured to have a reflectance in each spectral band of 90% or greater, 95% or greater, or 99% or greater;
the optically-powered reflector is configured to transmit ambient light at one or more wavelengths outside the one or more spectral bands;
the optically-powered reflector comprises an optically-powered dichroic reflector;
the optically-powered reflector comprises a transparent substrate and a dichroic reflective coating disposed on one surface of the transparent substrate;
the optically-powered reflector is configured to partially reflect the image light, for example wherein the optically-powered reflector is configured to reflect 50% of the image light;
the optically-powered reflector comprises an optically-powered partial reflector; and
the optically-powered reflector comprises a transparent substrate and a partially reflective coating, such as a half-silvered partially reflecting coating, disposed on one surface of the transparent substrate.

7. The optical system as claimed in claim 1, comprising a circular polariser for circularly polarising the ambient light before the ambient light is incident on the first side of the optical combiner, for example wherein the circular polariser is disposed on an outer surface of the optically-powered reflector.

8. The optical system as claimed in claim 1, wherein at least one of:
the polarisation-dependent reflector and the optically-powered reflector define an optical cavity, and the retarder is located in the optical cavity;
the optical cavity comprises air or is air-filled;
a solid transparent member or a solid transparent material is located in the optical cavity; and
the optical cavity is filled with a solid transparent material such as a polymer material or a glass material.

9. The optical system as claimed in claim 1, comprising:
an optical spreader for spreading the image light so as to form spread image light and, optionally, wherein:
the optical spreader is located between the image generator and the optical combiner; or
the optical spreader is located within, or forms part of, the optical combiner.

10. The optical system as claimed in claim 9, wherein at least one of:
the optical spreader is configured to be located in the field of view of the user;
the optical spreader is configured to selectively spread light incident on the optical spreader according to an angle of incidence of the light incident on the optical spreader;
the optical spreader is configured to transmit the ambient light without spreading the ambient light;
the optical spreader is configured to transmit the ambient light without aberration of the ambient light;
the optical spreader comprises an optical fan-out component; and
the optical spreader comprises a hologram such as a volume phase hologram (VPH);
the optical spreader comprises an optical beam-expander or an optical diffuser;
the optical spreader has no optical power;
the optical spreader is flat or planar;
the optical spreader is optically-powered; and
the optical spreader is curved.

11. The optical system as claimed in claim 9, wherein the optical spreader is configured to transmit and spread the image light so as to form the spread image light or wherein the optical spreader is configured to reflect and spread the image light so as to form the spread image light.

12. The optical system as claimed in claim 9, wherein the optical spreader and the optical combiner are both curved and, optionally, wherein the optical spreader and the optical combiner are both curved and concentric or near-concentric.

13. The optical system as claimed in claim 9, wherein the image generator is configured to focus the image light to a focal plane and the optical spreader is located at the focal plane.

14. The optical system as claimed in claim 9, comprising an optical waveguide for guiding the image light from the image generator to the optical spreader and, optionally, wherein the optical waveguide is configured to allow the ambient light to pass through a thickness of the optical waveguide, for example without aberration of the ambient light.

15. The optical system as claimed in claim 1, wherein at least one of:
the image generator is, or comprises, an image projector for projecting the image light;
the image generator is, or comprises, a scanning laser projector such as an off-axis scanning laser projector;
the optical system is, or comprises, an off-axis projection display such as an off-axis retinal scanning display;
the image generator is, or comprises, an LED-based projector such as an LED-LCOS projector or a micro-LED projector; and
the image generator is, or comprises, a digital micromirror array projector or a digital light processing (DLP) projector.

16. The optical system as claimed in claim 1, wherein the image generator comprises a display and, optionally, wherein the display is configured for location in the field of view of the user, for example wherein the display comprises a transparent display such as a transparent OLED display and, optionally, wherein the optical system comprises a linear polariser located on an optical path between the display and the optical combiner.

17. The optical system as claimed in claim 1, comprising one or more optically-powered lenses and/or one or more eyewear lenses having no optical power.

18. A wearable AR display comprising:
the optical system as claimed in claim 1; and
a support frame for mounting the optical system on a user so that the optical combiner is positioned in a field of view of the user.

19. The wearable AR display as claimed in claim 18, comprising first and second user-side eyepieces, wherein one of the first and second user-side eyepieces comprises the optical combiner and optionally also the optical spreader, wherein the support frame comprises a user-side support frame, and wherein the first and second user-side eyepieces are mounted on the user-side support frame.

20. The wearable AR display as claimed in claim 19, comprising a world-side support frame and first and second world-side eyepieces mounted on the world-side support frame, wherein the world-side support frame is reconfigurable between a first configuration in which the world-side support frame is held in place in front of the user-side support frame so as to hold each of the first and second world-side eyepieces in a corresponding line of sight between a scene and a user's corresponding eye in front of the corresponding user-side eyepiece, and a second configuration in which each of the first and second world-side eyepieces is positioned out of the corresponding line of sight.

21. The wearable AR display as claimed in claim 20, wherein the user-side support frame and the world-side support frame are detachably attachable to one another, for example wherein the world-side support frame is detachably attachable to the user-side support frame in front of the user-side support frame so as to position and hold the first and second world-side eyepieces in place in front of the first and second user-side eyepieces respectively, for example wherein the user-side support frame and/or the world-side support frame include one or more fastener arrangements such as one or more clip arrangements, one or more magnetic arrangements, one or more hook arrangements and/or one or more latch arrangements for holding each of the first and second world-side eyepieces in the corresponding line of sight between the scene and the user's corresponding eye in front of the corresponding user-side eyepiece.

22. The wearable AR display as claimed in claim 20, wherein the user-side support frame and the world-side support frame are attached by one or more hinges to enable the world-side support frame to be rotated into position and held in place in front of the user-side support frame so as to position the first and second world-side eyepieces in front of the first and second user-side eyepieces respectively.

23. The wearable AR display as claimed in claim 20, wherein the alignment between the world-side support frame and the user-side support frame is adjustable to facilitate alignment of the first and second world-side eyepieces relative to the first and second user-side eyepieces respectively.

24. The wearable AR display as claimed in claim 20, wherein one or both of the first and second world-side eyepieces comprises an optically-powered lens or an eyewear lens having no optical power and/or wherein one or both of the first and second world-side eyepieces comprises an optical filter and/or is at least one of: tinted, polarising, or electrochromic.

25. The wearable AR display as claimed in claim 19, comprising first and second world-side support frames and first and second world-side eyepieces mounted on the first and second world-side support frames respectively, wherein each of the first and second world-side support frames is reconfigurable between a first configuration in which the world-side support frame is held in place in front of the user-side support frame so as to hold the corresponding world-side eyepiece in a corresponding line of sight between a scene and a user's corresponding eye in front of the corresponding user-side eyepiece, and a second configuration in which the corresponding world-side eyepiece is positioned out of the corresponding line of sight.

26. The wearable AR display as claimed in claim 25, wherein the user-side support frame and the first world-side support frame are detachably attachable to one another and/or the user-side support frame and the second world-side support frame are detachably attachable to one another, for example wherein the first world-side support frame is detachably attachable to the user-side support frame in front of the user-side support frame so as to position and hold the first world-side eyepiece in place in front of the first user-side eyepiece and/or the second world-side support frame is detachably attachable to the user-side support frame in front of the user-side support frame so as to position the second world-side eyepiece in front of the second user-side eyepiece, for example wherein the user-side support frame and/or one or both of the first and second world-side support frames include one or more fastener arrangements such as one or more clip arrangements, one or more magnetic arrangements, one or more hook arrangements and/or one or more latch arrangements for holding the first world-side eyepiece in the corresponding line of sight between the scene and the user's corresponding eye in front of the first user-side eyepiece and/or for holding the second world-side eyepiece in the corresponding line of sight between the scene and the user's corresponding eye in front of the second user-side eyepiece.

27. The wearable AR display as claimed in claim 26, wherein the user-side support frame and the first world-side support frame are attached by one or more hinges to enable the first world-side support frame to be rotated into position and held in place in front of the user-side support frame so as to position the first world-side eyepiece in front of the first user-side eyepiece and/or wherein the user-side support frame and the second world-side support frame are attached by one or more hinges to enable the second world-side support frame to be rotated into position and held in place in front of the user-side support frame so as to position the second world-side eyepiece in front of the second user-side eyepiece.

28. The wearable AR display as claimed in claim 25, wherein the alignment of one or both of the first and second world-side support frames is adjustable relative to the user-side support frame to facilitate the alignment of the first world-side eyepiece relative to the first user-side eyepiece and/or to facilitate the alignment of the second world-side eyepiece relative to the second user-side eyepiece.

29. A vehicle, such as a terrestrial vehicle or an aircraft, comprising the optical system of claim 1, for example wherein the vehicle comprises a windscreen, and wherein the optical combiner is incorporated into the windscreen.

* * * * *